United States Patent [19]

Trahey et al.

[11] Patent Number: 5,331,964
[45] Date of Patent: Jul. 26, 1994

[54] ULTRASONIC PHASED ARRAY IMAGING SYSTEM WITH HIGH SPEED ADAPTIVE PROCESSING USING SELECTED ELEMENTS

[75] Inventors: Gregg E. Trahey, Hillsborough, N.C.; Paul D. Freiburger, Dubuque, Iowa; Stephen W. Smith, Durham, N.C.; Stewart S. Worrell, Lexington, Va.

[73] Assignee: Duke University, Durham, N.C.

[21] Appl. No.: 62,060

[22] Filed: May 14, 1993

[51] Int. Cl.$^5$ .............................................. A61B 8/00
[52] U.S. Cl. .......................... 128/661.01; 128/660.07; 364/413.25
[58] Field of Search ...................... 128/661.01, 660.06, 128/660.07; 364/413.25; 73/625, 626, 602; 324/76.82

[56] References Cited

U.S. PATENT DOCUMENTS

| | | | |
|---|---|---|---|
| 4,140,022 | 2/1979 | Maslak | 73/626 |
| 4,149,420 | 4/1979 | Hutchison et al. | 73/626 |
| 4,279,157 | 7/1981 | Schomberg et al. | 73/618 |
| 4,566,459 | 1/1986 | Umemura et al. | 73/597 |
| 4,607,218 | 8/1986 | Stösel | 324/76.82 |
| 4,633,883 | 1/1987 | Matsui | 73/597 |
| 4,700,573 | 10/1987 | Savord | 73/625 |
| 4,817,614 | 4/1989 | Hassler et al. | 73/625 |
| 4,852,577 | 8/1989 | Smith et al. | 73/625 |
| 4,989,143 | 1/1991 | O'Donnell et al. | 364/413.25 |
| 5,184,623 | 2/1993 | Mallart | 128/661.01 |
| 5,203,336 | 4/1993 | Iida et al. | 128/660.07 |

OTHER PUBLICATIONS

D. J. Phillips et al.; *Sampled Aperture Techniques Applied to B-Mode Echoencephalography*, Acoustical Holography vol. 6, 103-120 (1975).

J. Jellins et al.; *Velocity Compensation in Water-Coupled Breast Echography*, Ultrasonics 11, 223-226 (1973).

S. W. Smith et al.; *Some Advances in Acoustic Imaging Through Skull*, Ultrasonic Tissue Characterization II, 209-218 (1978).

S. M. Miller-Jones, *Automated Arrival Time Correction for Ultrasonic Cephalic Imaging*, Ph.D. Thesis Duke University, Durham N.C. (1980).

M. Hirama et al., *Adaptive Ultrasonic Array Imaging System Through an Inhomogeneous Layer*, J. Acoust. Soc. of Amer. 71(1), 100-109 (1982).

M. Hirama et al. *Imaging Through an Inhomogeneous Layer by Least-Mean-Square Error Fitting*, J. Acoust. Soc. Amer. 75(4), 1142-1147 (1984).

A. Muller, *Real-Time Correction of Atmospherically Degraded Telescope Images Through Image Sharpening*, J. Opt. Soc. Amer. vol. 64 1200-1210 (1974).

E. H. Attia, *Phase Synchronizing Large Antenna Array Using the Spatial Correlation Properties of Radar Clutter*, Ph.D. Dissertation, University of Pennsylvania (1984).

B. D. Steinberg et al., *Self Calibration of Phased Arrays Using the Muller Buffington Theorem and Transmitter Location Diversity*, Valley Forge Research Center Quarterly Report #50, 31-45 (1986).

B. D. Steinberg, *Distortion Correction by Image Feedback Control*, Valley Forge Research Center Quarterly Report #49, 54-58 (1986).

(List continued on next page.)

Primary Examiner—Angela D. Sykes
Assistant Examiner—George Manuel
Attorney, Agent, or Firm—Bell, Seltzer, Park & Gibson

[57] ABSTRACT

Disclosed is an ultrasonic phased array imaging system which includes a normal mode and an adaptive mode of operation. The adaptive mode adjusts the delay associated with each element in the transducer such that the average image brightness of the region of interest is maximized. Also disclosed is a method of correcting for phase aberration using selected elements of an ultrasonic array specific to each element of the array to correct each element of the array. It is further disclosed that the use of corrected elements to correct subsequent elements in the array results in more accurate phase aberration correction. In a preferred embodiment, the determination of the maximum average image brightness is performed more accurately through the use of selectable transducer array elements and previously corrected data during adaptive processing.

25 Claims, 12 Drawing Sheets

OTHER PUBLICATIONS

G. E. Trahey, et al.; *Phase Aberration Correction in Medical Ultrasound Using Speckle Brightness as a Quality Factor*, The Journal of the Acousticsl Society of America, vol. 85 1819–1833, (1989).

R. F. Wagner, *Statistics of Speckle in Ultrasound B-Scans*, IEEE Transactions on Sonics and Ultrasonics, vol. 30, No. 30 156–163, (1983).

O. Bonnefous, et al.; *A New Velocity Estimator for Color Flow Mapping*, Ultrasonics Symposium, 855–859 (1986).

C. H. Burckhardt, *Speckle in Ultrasound B-Mode Scans*, IEEE Transactions on Sonics and Ultrasonics, vol. SU-25, No. 1 1–6 (1978).

G. E. Trahey, et al.; *An Evaluation of Transduer Design and Algorithm Performance for Two Dimensional Phase Aberration Correction*, Ultrasonics Symposium, 1181–1187 (1991).

L. M. Bohs, et al.; *A Novel Method for Angle Independent Ultrasonic Imaging of Blood Flow and Tissue Motion*, IEEE Transactions on Biomedical Engineering, vol. 38, No. 3 280–286 (1991).

D. J. Phillips, et al.; *A Phase Compensation Technique for B-Mode Echoencephalography*, Ultrasound in Medicine, vol. 1 395–404 (1975).

S. Kontis, *Algorithms for Fast Computation of the Intensity Weighted Mean Doppler Frequency*, Medical & Biomedical Engineering & Computing, 25 75–76 (1987).

S. W. Flax, et al.; *Statistical Evaluation of the Doppler Ultrasonic Blood Flowmeter*, Biomedical Science Instrumentation, vol. 7 201–222 (1970).

C. Kasai, et al.; *Real-Time Two-Dimensional Blood Flow Imaging Using an Autocorrelation Technique*, Transactions on Sonics and Ultrasonics, vol. SU-32, No. 3 458–463 (1985).

O. Von Ramm, et al.; *Beam Steering with Linear Arrays*, Transactions on Biomedical Engineering, vol. BME-30, No. 8 438–452 (1983).

R. Mallart, et al.; *The Van Cittert–Zernike Theorem in Pulsed Ultrasound. Implications for Ultrasonic Imaging*, Ultrasonics Symposium, 1603–1607 (1990).

D. Rachlin: *Direct Estimation of Aberrating Delays in Pulise-Echo Imaging Systems*, Acoustical Society of America, 88 191–198 (1990).

G. E. Trahey, et al.; *Properties of Acousticsl Speckle in the Presence of Phase Aberration Part I: First Order Statistics*, Ultrasonic Imaging, 10 12–28 (1988).

S. W. Flax, et al.; *Phase–Aberration Correction Using Signals from Point Reflectors and Diffuse Scatterers: Basic Principles*, IEEE Transactions on Ultrasonics, Ferroelectrics, and Frequency Control, vol. 35 No. 6 758–767 (1988).

M. O'Donnell, et al.; *Real–Time Phase Aberration Correction System for Medical Ultrasound Imaging*, Annual International Conference of the IEEE Engineering in Medicine and Biology Society, vol. 12, No. 1 0278–0280 (1990).

M. O'Donnell, et al.; *Correlation–Based Aberration Correction in the Presence of Inoperable Elements*, IEEE Transactions on Ultrasonics, Ferroelectrics, and Frequency Control, vol. 39 No. 6 700–707 (1992).

M. Fink, et al.; *Self Focusing in Inhomogeneous Media with "Time Reversal" Acoustic Mirrors*, Ultrasonics Symposium, 681–686 (1989).

M. O'Donnell, et al.; *Measurement of Arterial Wall Motion Using Fourier Based Speckle Tracking Algorithms*, Ultrasonics Symposium, 1101–1104 (1991).

H. G. Pavy, Jr., et al.; *An Improved Real Time Volumetric Ultrasonic . Imaging System*, Medical Imaging V: Image Physics, vol. 1443 54–61 (1991).

G. E. Trahey, et al.; *The Impact of Acoustic Velocity Variations on Target Detectability in Ultrasonic Images of the Breast*, Investigative Radiology, vol. 26 No. 9 782–791 (1991).

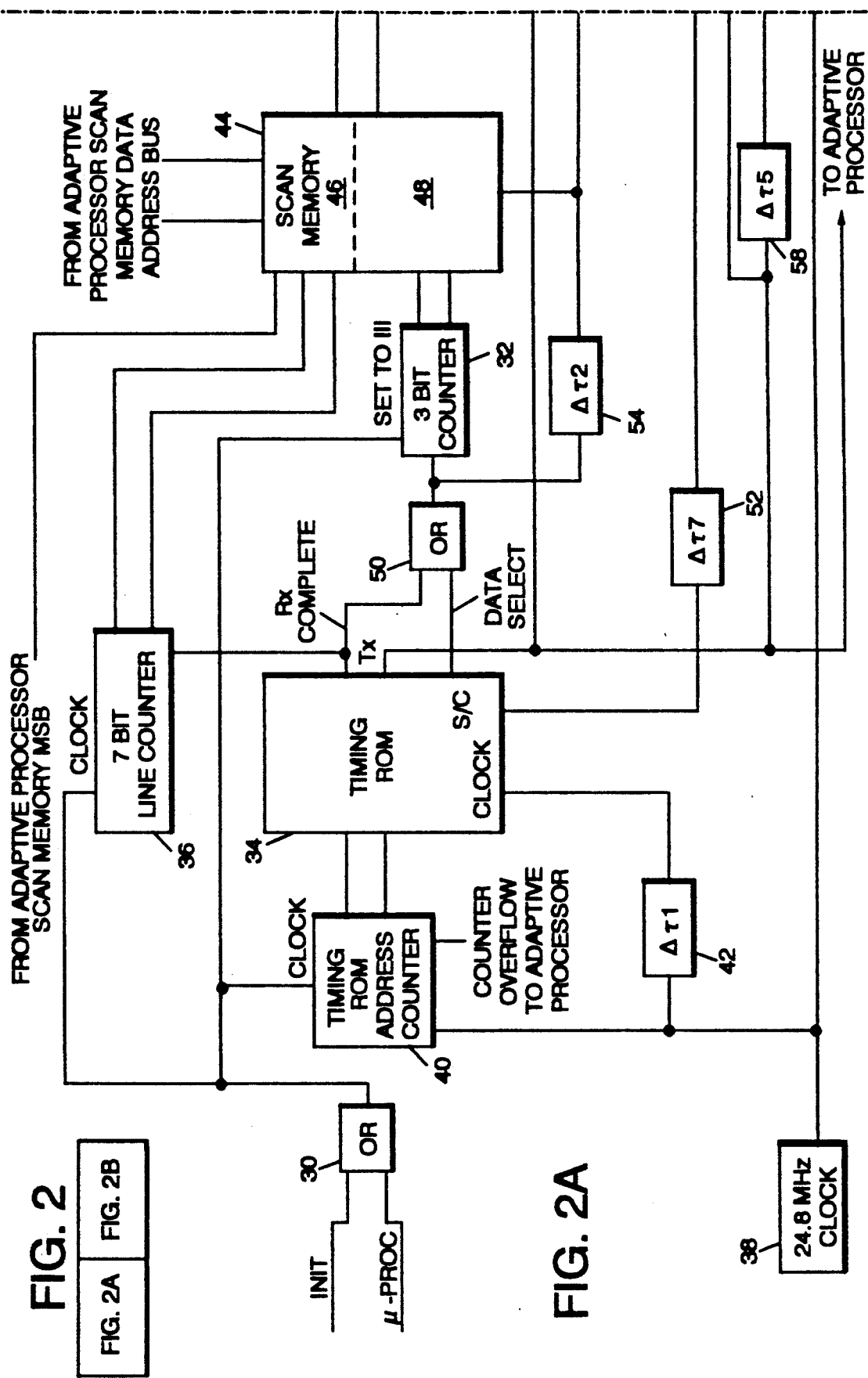

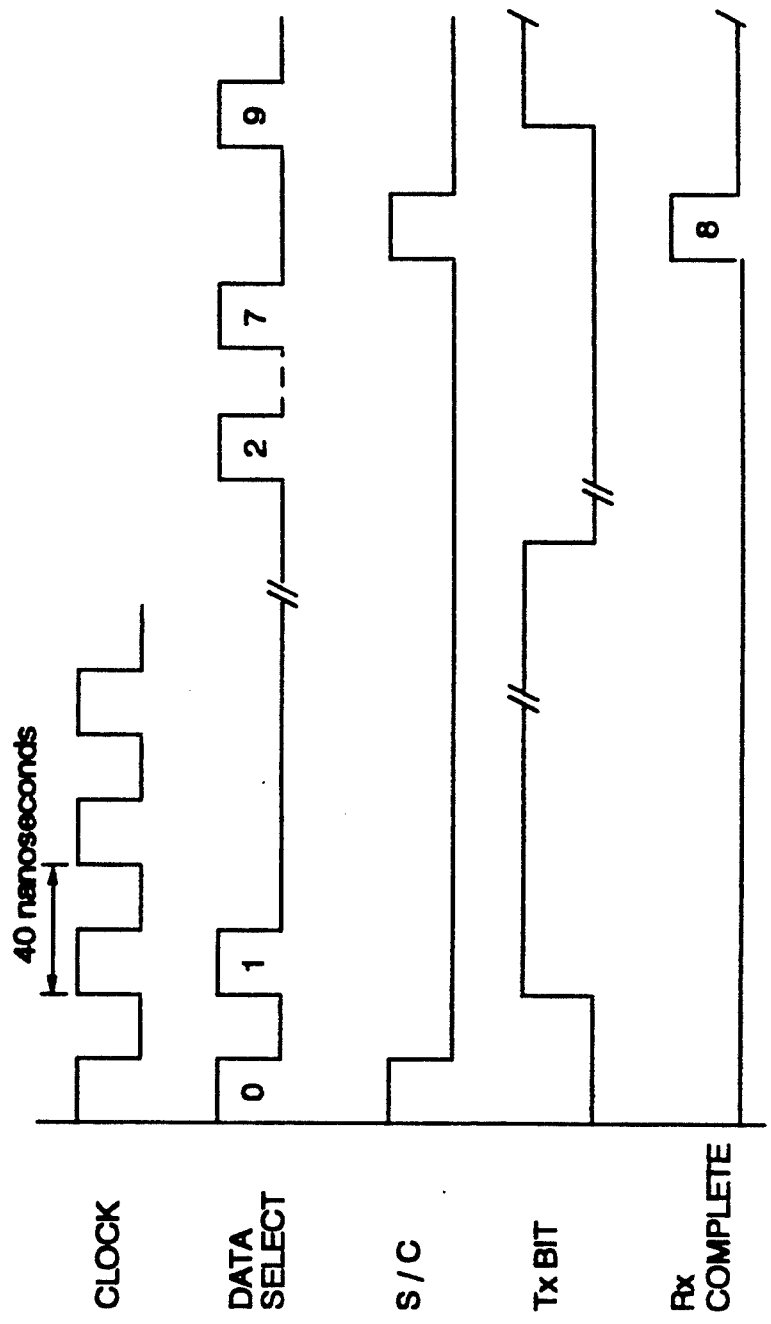

FIG. 4

| 0 | SCAN DATA SET #1, LINE #1 | SINE WORD / COSINE WORD |
|---|---|---|
| 1 | TRANSMIT DATA, 64 BITS | |
| 2 | RECEIVE DATA, FOCAL ZONE #1, 64 BITS | |
| 7 | FOCAL ZONE #6, 64 BITS | |
| 8 | LINE #2 | SINE WORD / COSINE WORD |
| 1023 | LINE #128 RECEIVE DATA, FOCAL ZONE #6 | |
| 1024 | SCAN DATA SET #2, LINE #1 | SINE WORD / COSINE WORD |
| 1025 | TRANSMIT DATA | |
| 2047 | LINE #128 RECEIVE DATA, FOCAL ZONE #6 | |

FIG. 5A
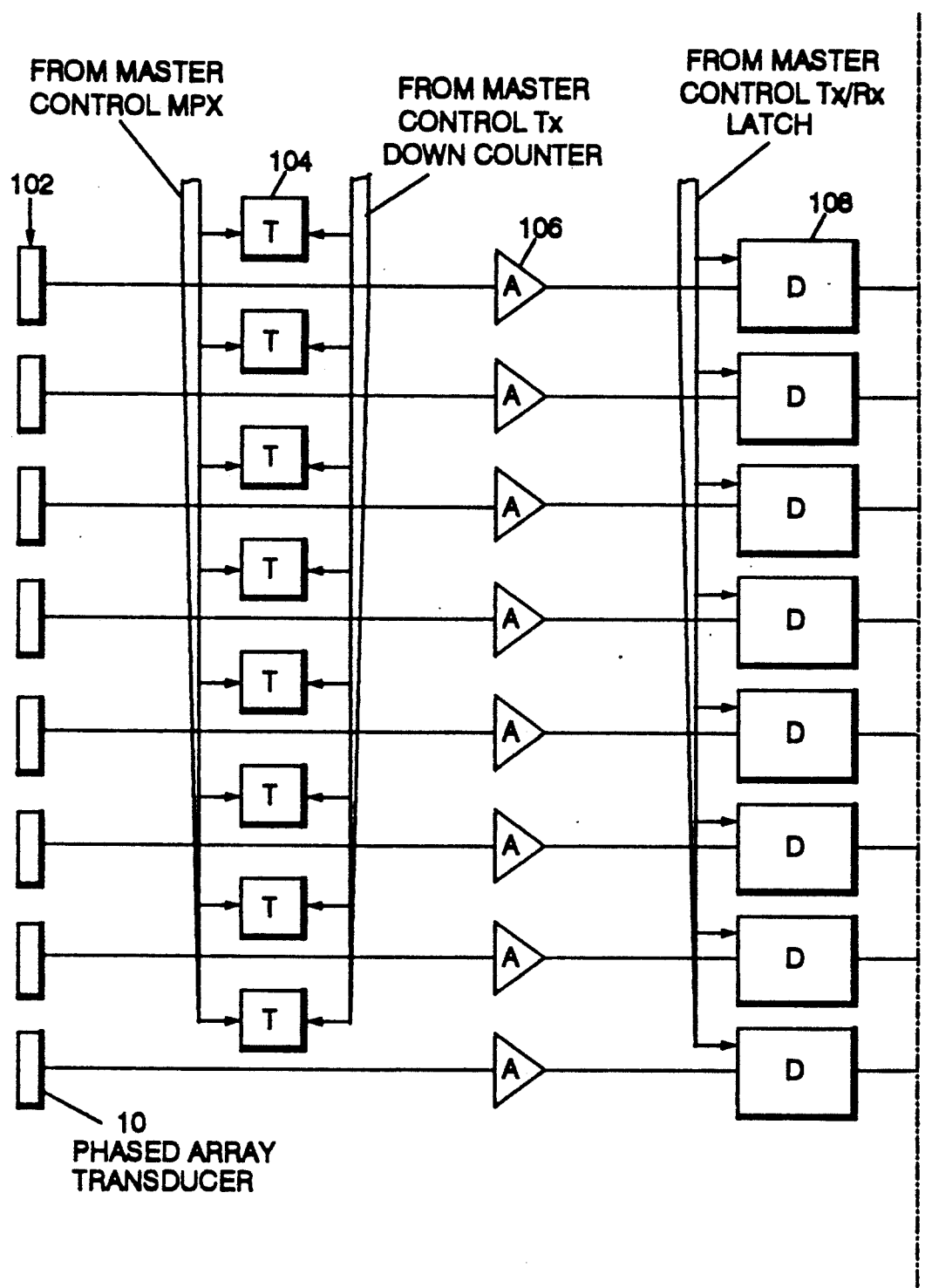
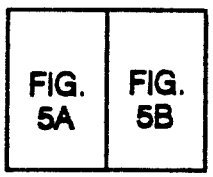

FIG. 8

| ADDRESS IN | ELEMENT WHOSE PHASING IS BEING OPTIMIZED | ADAPTIVE MEMORY OUTPUT ELEMENTS INCLUDED IN SUM 110 (1 = INCLUSION) | | | | | | | |
|---|---|---|---|---|---|---|---|---|---|
| | | 1 | 2 | 3 | 4 | 5 | 6 | 7 | 8 |
| 0 0 0 | ELEMENT 1 | 1 | 1 | 1 | 1 | 1 | 1 | 1 | 1 |
| 0 0 1 | ELEMENT 2 | 1 | 1 | 0 | 0 | 0 | 0 | 0 | 0 |
| 0 1 0 | ELEMENT 3 | 1 | 1 | 1 | 0 | 0 | 0 | 0 | 0 |
| 0 1 1 | ELEMENT 4 | 1 | 1 | 1 | 1 | 0 | 0 | 0 | 0 |
| 1 0 0 | ELEMENT 5 | 0 | 1 | 1 | 1 | 1 | 0 | 0 | 0 |
| 1 0 1 | ELEMENT 6 | 0 | 0 | 1 | 1 | 1 | 1 | 0 | 0 |
| 1 1 0 | ELEMENT 7 | 0 | 0 | 0 | 1 | 1 | 1 | 1 | 0 |
| 1 1 1 | ELEMENT 8 | 0 | 0 | 0 | 0 | 1 | 1 | 1 | 1 |

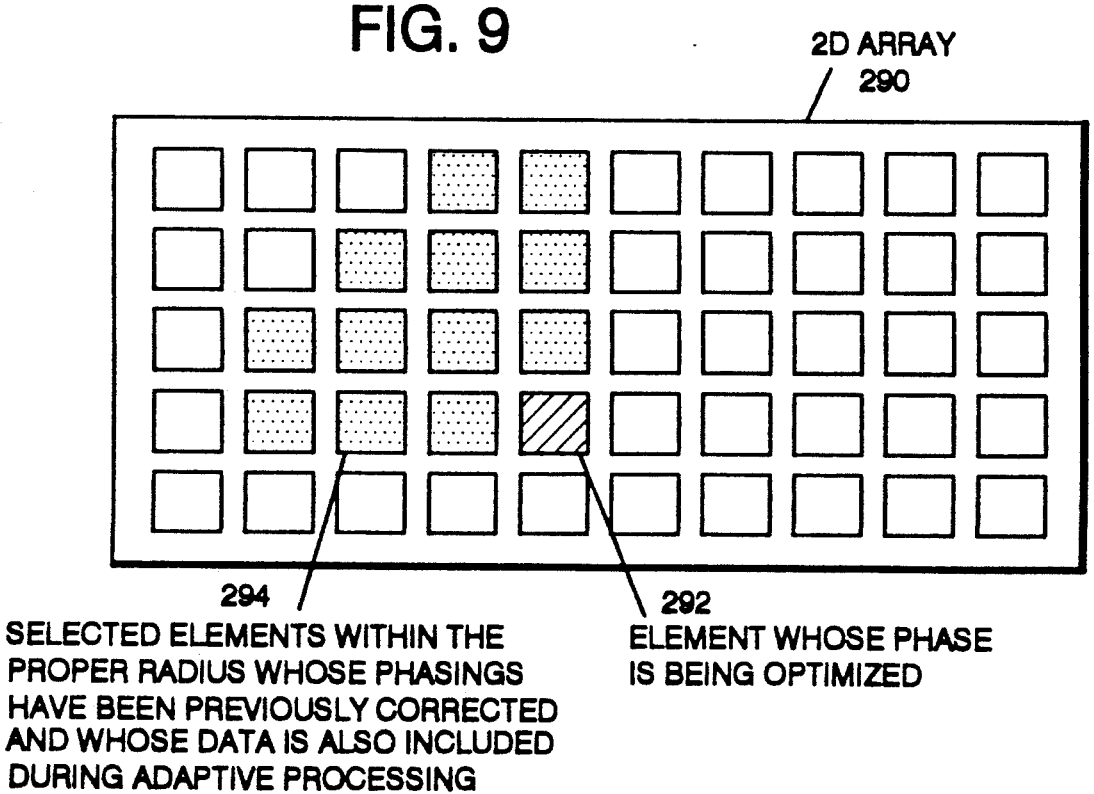

FIG. 9

2D ARRAY 290

294 SELECTED ELEMENTS WITHIN THE PROPER RADIUS WHOSE PHASINGS HAVE BEEN PREVIOUSLY CORRECTED AND WHOSE DATA IS ALSO INCLUDED DURING ADAPTIVE PROCESSING

292 ELEMENT WHOSE PHASE IS BEING OPTIMIZED

ULTRASONIC PHASED ARRAY IMAGING SYSTEM WITH HIGH SPEED ADAPTIVE PROCESSING USING SELECTED ELEMENTS

FIELD OF THE INVENTION

The present invention relates to improvements in ultrasonic imaging; and, more particularly, to improvements in a high speed adaptive ultrasonic phased array imaging system. The system employs an image sharpening process which determines an optimal phase aberration correction for a selected region of interest by varying the phased array scan data of array elements for the image lines within the region. The phase aberration correction is determined more accurately by only using selected transducer array elements during adaptive processing and more preferably by using data from already corrected elements in determining the correction of subsequent array elements.

BACKGROUND OF THE INVENTION

Ultrasonic imaging has been extensively applied in virtually every medical specialty in the form of pulse echo B-mode tomography (See Wells, 1977). B-mode tomography or B-scan systems display echoes returning to an ultrasonic transducer as brightness levels proportional to echo amplitude. The display of brightness levels results in cross sectional images of the object in the plane perpendicular to the transducer.

With present ultrasonic transducer arrays, transmit focusing and receive mode dynamic focusing are achieved by proper timing of the transmit signals and delaying receive mode echoes. For example, a sectored linear phased array consists of a single group of transducer elements which is not only focused but also steered over a sector angle in transmit and receive (Tx and Rx) by properly timing the transmit signals and receive mode echoes (see von Ramm et al., 1983).

In previous phased array imaging systems, the timing or phasing data is determined by assuming propagation of ultrasound pulses through a homogeneous tissue medium with a uniform velocity of sound, usually 1540 m/sec. The assumption of a constant velocity of sound in the body is also the design basis in all ultrasound scanning systems for converting round trip pulse-echo time of flight into target range in the image. Unfortunately, this simplest model of all human tissues is not valid. The body is actually composed of inhomogeneous layers of differing tissues (fat, muscle and bone) with bumps and ridges of varying thicknesses and different acoustic velocities. These layers intervene between the transducer and the internal organ of interest. The propagation velocity of ultrasound varies from approximately 1470 m/sec in fat to greater than 1600 m/sec in muscle and nervous tissue to as much as 3700 m/sec in bone (see Goss et al.). If an incorrect average velocity is chosen, B-scan imaging is known to result in an image range error and compound scan registration errors for all ultrasound systems.

Under the assumption of a uniform tissue medium of constant velocity, the presence of inhomogeneous tissues can also result in image artifacts, range shifts, geometric distortions, broadening of the transducer beam pattern which degrades the ideal diffraction limited lateral resolution, and increased side lobes which reduce the signal to noise ratio in the image. These problems occur in all types of pulse echo ultrasound systems to some degree.

The adverse effects of inhomogeneous nonuniform tissue layers have been analyzed by several investigators primarily in terms of unknown phase aberrations associated with the inhomogeneities introduced across the transducer aperture (see Trahey et al., 1991). Attempts have been made to overcome these aberrations using various signal processing techniques. These attempts include the B-scan phase correction techniques first described in Phillips et al. (Acoustical Holography, 1975), and later described in Smith et al. (NBS Pub. #525, 1978) and U.S. Pat. No. 4,817,614.

The phase aberration compensation method of Smith et al. in U.S. Pat. No. 4,852,577 is based on the understanding of medical ultrasound images of tissue which consists primarily of a random speckle interference pattern resulting from the phasor summation of echoes from a large number of fine scatterers within the transducer resolution cell (see Burckhardt, 1978; and Wagner et al., 1983). The echoes from these particles exhibit phases uniformly distributed over 0 to $2\pi$ radians. Although the image brightness of an individual speckle is a random process, the mean image brightness and variance over an area is predictable.

Smith et al. in U.S. Pat. No. 4,852,577 have demonstrated that individual speckle spots change unpredictably from bright points to null as the phase function or aberration changes across the transducer aperture. However, the inventors have also demonstrated that the average image brightness of speckle in a region of interest is predictably decreased by transducer phase aberrations (see Trahey and Smith, 1988). Thus, an individual speckle in the image cannot be used as an image sharpening target. However, the average brightness of many speckles over a region of interest can be used as a quality factor in an image sharpening process for a phased array ultrasound scanner such as that disclosed in U.S. Pat. No. 4,852,577 issued to Smith et al. the disclosure of which is incorporated herein by reference as if set forth fully. In U.S. Pat. No. 4,852,577, the average brightness of the coherent sum of all of the elements in a phased array transducer for an entire region of interest in an image was utilized to correct for phase aberration. This method suffers from using poorly correlated data and an unstable reference phase. In contrast, the present invention utilizes a selected subset of the elements of the transducer array for the region of interest which was unexpectedly found to provide superior correction.

Another method for phase aberration correction has been described by M. O'Donnell et al. in U.S. Pat. Nos. 4,835,689 and 4,989,143 and by Hassler et al. in U.S. Pat. No. 4,817,614 the disclosures of which are incorporated herein by reference as if set forth fully. In this method for a region of interest in an ultrasound speckle image, a cross correlation function is calculated between two transducer array elements N and N+1 of a phased array system. The phased array scan data between these two elements is varied until a maximum is achieved in the cross-correlation function. The process is then continued with element N+2 versus N+1. This method of using cross-correlation relies on a product, i.e., multiplication, rather than an integral or a sum, as in the average speckle brightness technique, and is only performed between signals received at adjacent elements, not selected combinations of transducer array elements as in the instant invention.

As described above, O'Donnell et al. and Hassler et al. describe a phase aberration correction method that extracts a compensating phase at each element using a cross-correlation between it and its adjacent neighbor. They make no attempt to include data from more than the two elements involved when extracting this phase information, and their method is sensitive to noise, dead elements and/or an unstable reference phase. Additionally, the instant invention incorporates data from elements that have been previously corrected into the correction of the data for each element, which produces a more stable reference phase than the methods of O'Donnell et al. and Rachlin, described below.

A modification of the method of O'Donnell et al. has been proposed by D. Rachlin (1990). In this modification, a matrix of cross-correlation functions between the data from every transducer array element in the system is used to maximize the phase closure when estimating the aberrating function. This algorithm is currently too computationally intensive to be considered for high speed applications and does not incorporate selected transducer array elements or make use of previously corrected data as in the instant invention. By using data from all of the elements instead of only selected elements, this technique uses some poorly correlated data when extracting the compensating phase at each element and losses accuracy in determining the exact shift. It also does not attempt to incorporate data from previously corrected elements into its correction which could lead to an unstable reference phase.

Another proposed method to remove the effects of spatially distributed velocity inhomogeneities is the "time-reversal-mirror" technique (see M. Fink et al., 1989). In this method, the received signals are digitized and stored at every transducer array element and then retransmitted using a last-in, first-out scheme. This method does not directly extract a compensating phase aberration profile and still has considerable technical difficulties to overcome before it can be applied to speckle targets.

The present inventors have recently determined the key features for successful phase aberration correction (see Trahey and Freiburger, 1991). For a phase aberration correction system to work optimally it needs to be insensitive to noise, insensitive to dead, missing or blocked elements, implemented on two dimensional arrays, use highly correlated data, and use a stable reference phase while correcting each of the elements. If a phase aberration correction method is sensitive to noise or to dead elements it will perform poorly at extracting the compensating profile and may even introduce more severe phase aberration than that which is being removed. Removing the effects of phase aberration in only one dimension does little or nothing to improve image quality because there are still components of the aberrator in the other dimension. Phase aberration correction performance can be greatly enhanced by aligning the phase of element groups which have highly correlated data because the exact phase relationship between signals becomes obscured when the data is uncorrelated. Lastly, if the reference phase changes when correcting the data at different elements in an array then the change in reference phase will still be present after the correction over the entire array is complete. This left-over difference in phase between elements is still phase aberration and degrades image quality. Previous phased array ultrasonic imaging systems did not fully utilize these features and perform less than optimally at compensating phase aberration.

In view of the above discussion, it is, therefore, an object of the present invention to provide an on-line adaptive ultrasonic pulse echo phased array imaging device which corrects for transducer phase aberrations and optimizes spatial resolution.

It is a further object of the present invention to provide an adaptive pulse echo phased array imaging system which is insensitive to noise.

Yet another object of the present invention is to provide an adaptive pulse echo phased array imaging system which is insensitive to dead, missing or blocked elements of the ultrasonic transducer array.

It is another object of the present invention to provide an adaptive pulse echo phased array imaging system which uses highly correlated data and a stable reference phase to correct phase aberrations in each element of the ultrasonic transducer array.

It is still a further object of the present invention to provide an adaptive phased array imaging system that can use signals received on selected subsets of the receive array. These subsets can include signals received within a radius of a given element or signals with previously corrected phases received within a radius of a given element or signals from previously corrected elements.

Still other objects, features and attendant advantages of the present invention will become apparent to those skilled in the art from a reading of the following detailed description of the embodiments constructed in accordance therewith, taken in conjunction with the accompanying drawings.

SUMMARY OF THE INVENTION

One embodiment of the present invention provides a method of ultrasonic imaging utilizing an ultrasonic transducer array having a plurality of transducer elements. The method of the present invention comprises receiving a first set of phased array echo data corresponding to a region of interest in the scan from an ultrasonic transducer array wherein each member of said set of phased array echo data corresponds to one of the plurality of transducer elements in the transducer array. An optimal phase aberration correction is then calculated for each element of the transducer array using echo data from a preselected subset of the transducer array elements specific to each element. A subsequent set of phased array scan control data of the ultrasonic transducer array is then corrected with the optimal phase aberration correction.

A second embodiment of the present invention provides a method of ultrasonic imaging utilizing an ultrasonic transducer array having a plurality of transducer elements. wherein the calculation of the optimal phase aberration correction comprises determining the phase aberration correction data for a first element of the ultrasonic array from phased array echo data of a subset of said transducer array elements to provide a first corrected element set. Then, for each subsequent element of the transducer array, the phase aberration correction data is determined for the subsequent element using data from the corrected element set corresponding to a preselected subset of the transducer array elements specific to the subsequent element. The corrected element set is then updated to include the phase aberration correction data for said subsequent element.

In an additional embodiment of the present invention, the phase aberration correction data is determined for the subsequent element using data selected from the group comprising the corrected element set and uncorrected transducer array elements corresponding to a preselected subset of the transducer array elements specific to the subsequent element.

A further embodiment of the present invention provides an ultrasonic phased array imaging system having a normal mode and an adaptive mode of operation. The ultrasonic phased array imaging system comprises a transducer, having a plurality of elements and circuitry for recording a region of interest from an image and adaptive means for adjusting phased array scan data associated with each element of the transducer. The adaptive means comprises means for determining an optimal phase aberration correction for each element of the transducer array with data from a preselected subset of the phased array echo data specific to the element, and means for updating a subsequent set of phased array scan control data from the ultrasonic transducer array for the region of interest with the optimal phase aberration correction. The ultrasonic phased array imaging system further provides means for entering the normal mode of operation.

Additional methods for determining the optimal phase aberration correction for each element of a phased array used in ultrasonic imaging, and apparatus for carrying out these methods of the present invention, are also provided.

BRIEF DESCRIPTION OF THE DRAWINGS

The invention of the present application will now be discussed in more detail with reference to the preferred embodiments of the device, given only by way of example, and with reference to the accompanying drawings, in which:

FIGS. 2, 2A and 2B are schematic representations of the master control according to the present invention;

FIG. 3 is a timing diagram showing the operation of the system according to the present invention;

FIG. 4 illustrates a map of the scan memory according to the present invention;

FIG. 5, 5A and 5B are a schematic representation of the signal processor according to the present invention;

FIG. 7, 7A and 7B are flow charts of the adaptive processor operating in the adaptive mode according to the present invention, and FIG. 8 illustrates a map of the adaptive group memory and a typical implementation according to the present invention.

FIG. 9 illustrates a map of elements that could be selected whose phases have been previously corrected within a radius of the element whose phase is currently being corrected for a two dimensional array according to the present invention.

DETAILED DESCRIPTION OF THE PREFERRED EMBODIMENTS

Figure 1:
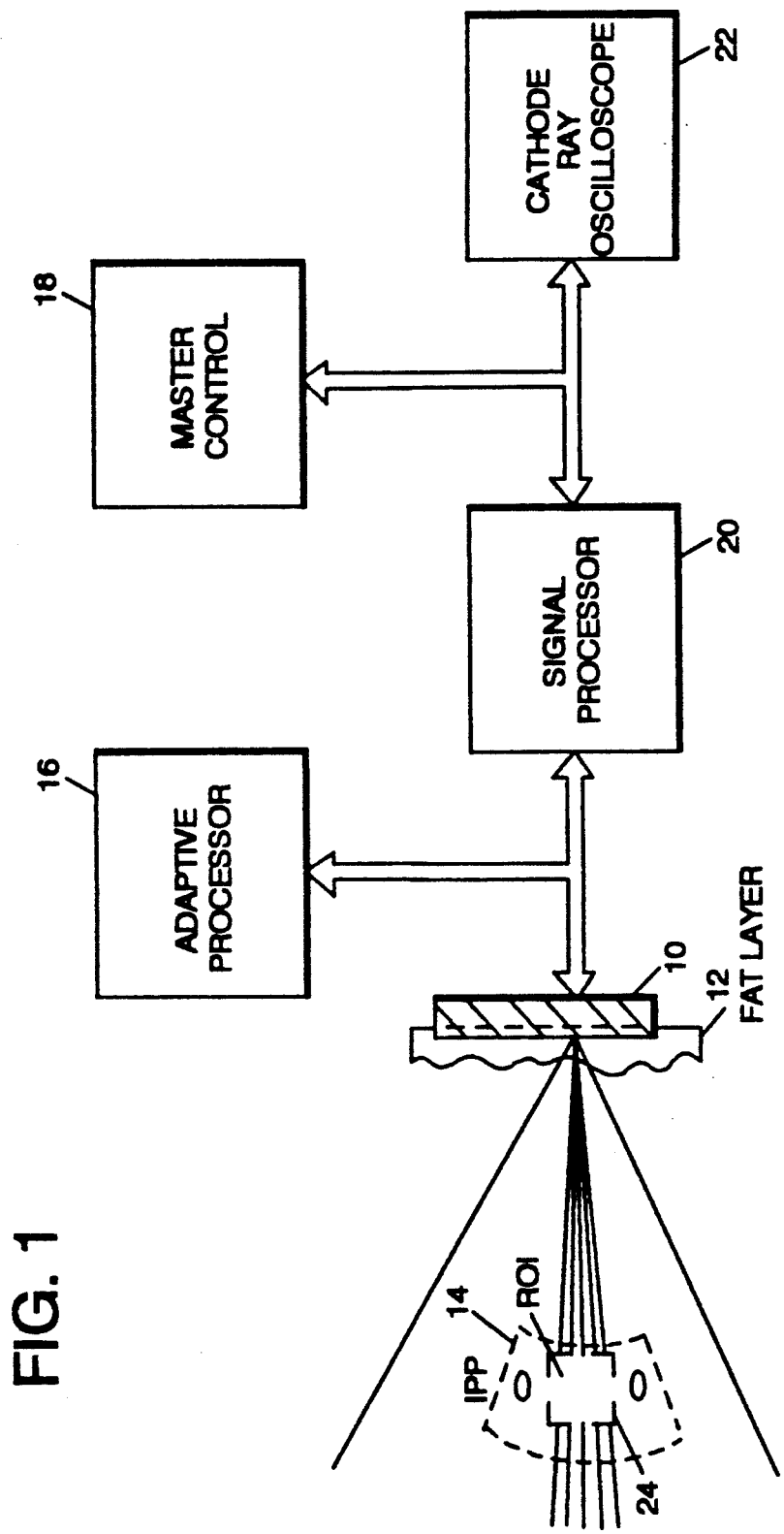
FIG. 1 is a block diagram showing a sector scan image of an abdominal organ parenchyma produced by the phased array imaging system according to the present invention.

The present invention relates to an on-line adaptive ultrasonic pulse echo phased array imaging device to correct for transducer phase aberrations and optimize spatial resolution. In a preferred embodiment of the present invention, the mean brightness of the ultrasound image texture of tissue parenchyma in a small region of interest is used as a quality factor. The mean brightness in the region is maximized by the image sharpening procedure as the sectored phased array scan data is varied on-line.

The present invention differs from the prior art ultrasound imaging in its ability to use only selected transducer array elements in the system during its adaptive processing. In a preferred embodiment of the present invention, such a modification improves the ability of the system to determine the phasing that maximizes the mean image brightness over the region of interest. Such a modification allows the adaptive processing to be implemented on echo data from transducer array elements within a small radius of the element that is being corrected using only previously corrected transducer array elements, which is the preferred implementation.

The present inventors have recently derived equations that can be used to calculate when the phase difference between two signals is most accurately determined. The following equations are based upon the use of elements which surround the element to be corrected and are preferably elements which have already been corrected. The uncertainty when extracting the phase difference between two signals is given by:

$$U = \frac{1}{4\pi} \cos^{-1}\left[ 1 - \frac{2}{\rho\left(S_1, \sum_{i=1}^{M} S_i\right)} \sqrt{\frac{2}{(E/N)}} \right] \quad \text{Equation 1}$$

where U is the uncertainty expressed as a fraction of the wavelength of the transducer center frequency, $\rho S1S2$ is the correlation between the two signals as defined below, and E/N is the power signal to noise ratio of a transducer element. The signal to noise ratio E/N can be readily measured for the system to be used and $\rho S1S2$ can be calculated using the following equation:

$$\rho_{S1S2} = \rho\left(S_1, \sum_{i=2}^{M} S_i\right) = \frac{\sum_{i=2}^{M} \rho(S_1, S_i)}{\sqrt{M - 1 + 2 \sum_{i=2}^{M} \sum_{j=i+1}^{M} \rho(S_i, S_j)}} \quad \text{Equation 2}$$

where $$\rho\left(S_1, \sum_{i=2}^{M} S_i\right)$$

is the correlation between signal one $S_1$ (from the element to be corrected) and the sum of several other signals, $\rho(S_i, S_j)$ is the correlation between signal i and signal j, and M is the number of summed elements minus one. The covariance between the signal received at an element in an array and the signal received at any other element in an array can be calculated using the following equation derived by Mallart and Fink (1990) for ultrasound speckle signals:

$$R_p(x) = \frac{x(f)}{Z^4} R_o(x) \quad \text{Equation 3}$$

where $R_p$ is the covariance between the data received at two elements in an array separated by x, $\chi(f)$ is the medium scattering function, z is the depth of the scatterers and $R_o$ is the autocorrelation of the transmit aperture function. Note that in Equation 3 the correlation between elements is further degraded by the presence of phase aberration across the transmit aperture. The uncertainty in Equation 1, or the error in compensating for a phase aberration at an element, can be reduced by increasing the correlation between the signal at the element being corrected and the reference signal $\rho S1S2$ and by increasing the power signal to noise ratio E/N. The correlation $\rho S1S2$ is maximized in Equation 2 by only using signals at adjacent elements while the signal to noise ratio E/N is maximized by using as many signals as possible. In actuality, the optimum number of elements (M) to be used to correct a particular element will be slightly greater than the number resulting from the above equations because of the physical and electrical properties which limit presently manufactured phased array transducers (i.e. dead elements, nonuniform response of elements, etc. . . ). For a linear array, the minimum uncertainty in Equation 1 is obtained by using the data received at elements that lie within about ¼ the length of the aperture from the element whose phase is being corrected.

The preferred implementation for the instant invention utilizes the mean speckle brightness technique and uses the signal received on the transducer element being corrected with signals received on several other transducer elements whose phases have been previously corrected within the calculated radius of the transducer element being corrected. The instant invention minimizes sensitivity to noise and dead elements through the use of data from multiple transducer elements when correcting the phase at each element. The instant invention is easily extended to two dimensional array geometries by using elements within a calculated radius in both dimensions. By selecting data from only those elements within the calculated radius of the element whose phase is being corrected, the optimum phase is more accurately determined. Lastly, by incorporating data from those elements whose phases have been previously corrected a more stable reference phase is obtained.

FIG. 1 depicts a sector scan of an abdominal organ parenchyma produced by an eight element sectored phased array imaging system. Ideally for phase aberration correction a two dimensional array would be used, but a one dimensional array is used for simplicity in this example. The image shows the fat and muscle layers 12 of inhomogeneous thickness at the apex of the scan. The presence of these layers across the eight element transducer array produces the undesired phase aberrations to be overcome. The phase aberrations are reasonably consistent over an isoplanatic patch superimposed on the scan by the large dashed box marked IPP 14. Also superimposed within the IPP 14 is a small region of interest ROI 24. The overall image resulting from the scan is characterized by a largely uniform texture consisting primarily of the ultrasound speckle interference pattern punctuated occasionally by discrete structures such as blood vessels.

The operation of the system proceeds as follows. The sectored phased array 10 can operate in conventional mode (see yon Rammet al., 1983) in which a no phase aberration condition is assumed, or in adaptive mode.

During conventional operation of the sector scanner, the user positions the ROI window by moving the transducer laterally and adjusting the gate to a desired range so that the ROI window falls over structures of interest as shown in FIG. 1. Alternatively, the system could search through the image and find a bright region automatically. At any time the user can initiate the adaptive mode by pushing a button, at which time the image line or lines which fall within the ROI are obtained sequentially. The average image brightness is measured within the ROI, using echo data from only the selected transducer array elements, and stored. Next, the phased array scan control data for a single transducer element or a group of adjacent elements is adjusted for those same image line or lines in the ROI, a new ROI brightness is measured and compared to the original. Image correction may be accomplished by correcting the existing stored echo data or by correcting the transmit mode control data, the receive mode control data or both for the phased array and then reacquiring new echo data reflecting the corrected control data. The process is repeated in turn for each array element, using the appropriate selected transducer array elements for each element, until the mean image texture brightness reaches a maximum. As used herein, phased array scan control data may be transmit mode control data, receive mode control data or both. At that point, the diffraction limited resolution is optimized in the IPP by modifying the transmit mode and receive mode phased array scan control data for all image lines in the IPP. The new phased array scan control data for lines in the IPP are then used during an optimized conventional scan. Following the conventional scan, the system reenters adaptive mode and performs another correction. The system continues in this manner alternating between an optimized conventional scan and adaptive mode until the user pushes a button returning the system to conventional mode without correction. It should also be noted that the adaptive processing does not have to be performed for every image formed; it could be done on every third image, every fourth image or some other sequence.

The operation of a preferred embodiment of the system will now be described in more detail. Alternative implementations will also be discussed. The described construction is that of an adaptive sectored phased array, but the system can also be used for the more simple cases of an adaptive annular phased array or an adaptive linear or curvilinear sequential phased array or for the more complicated case of a two dimensional array with few modifications. The transducer array includes eight piezoelectric elements in this example. The concepts of this description can be extended to any number of elements in 1-D or 2-D arrays. The processor operation may be carried out for each individual array element, or in groups of elements to speed up the operation and enhance the before/after brightness difference. Additionally, parallel signal processing techniques can be used to further speed up the operation. For example, the brightness of several regions of interest can be calculated for several different phasings of a single transducer element simultaneously, and/or the brightness of several different regions of interest can be calculated for several different transducer elements adjusted simultaneously.

The present invention will now be described with reference to FIGS. 1 through 9 described above.

FIG. 1 shows a block diagram of the imaging system which includes a Phased Array Transducer 10, the master Control (MC) 18, the Signal Processor 20, the Adaptive Processor 16, and the Cathode Ray Oscilloscope 22. The function and operation of each of these components will be described for the example system. This example imaging system produces 128 image lines for an eight element array. Each image line contains six receive mode focal zones providing dynamic focusing in receive. In describing the system, it is helpful to consider its operation first in conventional phased array mode. In the conventional mode, the Master Control (MC) be regulates the function of the imaging system.

Figure 2B:
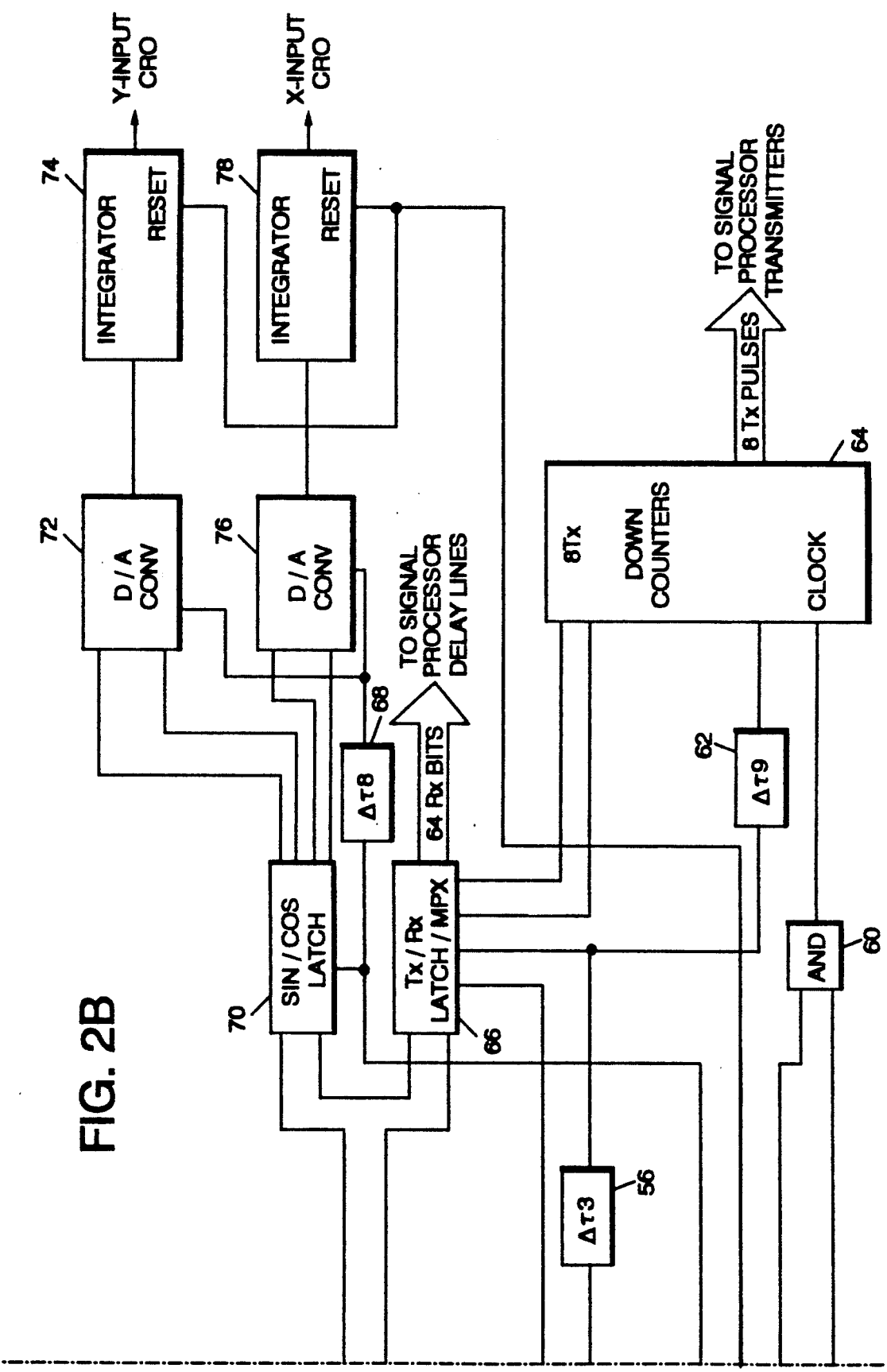

FIG. 2 is a schematic of the Master Control 18 be. In conventional mode, an external input signal (such as the closing of a switch), denoted by INIT, begins operation of the imaging system through OR gate 30 by initiating several functions of the master Control. The INIT signal initiates the three bit counter 32 by setting it to 111. INIT also clears the Timing ROM Address Counter 40 and the 7 bit line counter 36.

This implementation of the imaging system is paced by an 24.8 MHz master clock 38, resulting in a pulse rate of one pulse approximately every 40 nsec. The clock pulses are sent to the Timing ROM Address Counter 40 which then increments the address of the Timing ROM 34 every 40 nsec. The Timing ROM 34 is also cycled by the master clock pulses after a preselected delay 42 $\Delta \tau 1$. The Timing ROM 34 is a Read Only Memory, 4 bits wide and several thousands of bits long depending on the maximum range of echo information in the image and the number of image lines. The data contained in the Timing ROM 34 has been calculated off-line according to the conventional techniques of phased array imaging devices and is loaded into the Timing ROM 34 prior to the operation of the imaging system.

The Timing ROM 34 data provide accurate timing pulses to signal the transmission and reception of the 128 ultrasonic image lines. The 4 bits of the Timing ROM 34 include the sine/cosine bit (S/C), the Data Select bit, the Transmit bit (Tx), and the Receive Complete bit (Rx complete). A diagram indicating the relative timing of these signals and the pulses of the master clock are shown in FIG. 3. In the Master Control 18, the Scan Memory 44 contains the phased array sector scan delay data for transmit and receive. In conventional operation, the lower portion of this memory is used (Scan Memory 46) and the data is calculated off-line assuming the geometry and uniform tissue velocity (1540 m/sec) of phased array beam steering (see yon Ramm et al., 1983).

The most significant bit of the scan memory address is set when the scanner operates in adaptive mode shifting to the upper Scan Memory 48. Initially the phase data in the two scan memory portions 46 and 48 are identical. The next seven most significant bits of the Scan Memory address are composed of the output of the seven bit image Line Counter 36 corresponding to 128 image lines. The three least significant bits of the Scan memory address consists of the output of the three bit counter 32 which was initialized by being set to 111 by the INIT signal. The three bit counter 32 is incremented by the output of OR gate 50 whose inputs are the Data Select bit and the Rx complete bit of the Timing ROM 34. Thus each address in the Scan memory 44 is uniquely determined by the 11 bit word resulting from the combination of the 1 bit Conventional/Adaptive mode choice, the 7 bit image Line Counter 36 output and the three bit Data Select counter 32.

FIG. 4 shows a map of the Scan Memory 44 which contains the data for the two independent Scan Data sets. Each data set includes the data for (1) the display steering angle, (2) 128 focused transmit steering angles, and (3) 128 receive steering angles at six focal zones. Each scan data set is divided into 128 blocks corresponding to each of the 128 image lines. Each block contains eight words each of 64 bits. In the first word of each block, the 8 MSB's contain the sine of each image line of the sectored phased array steering angle of FIG. 1. The next 8 MSB's contain the cosine of the sectored phased array steering angle. The remaining bits of the first word of each block are not in use. In the second word of each block, the 64 bits contain the transmit timing data for the eight transducer elements of the phased array transducer. There are eight bits of transmit control data for each of the eight transducer elements. The next six words of each block contain the receive mode control data for six focal zones. As in the transmit word, there are eight bits of receive mode control data for each of the eight transducer elements. The two data sets of 128 blocks, each block containing eight words, result in a scan memory size of 2048 words, addresses 0 to 2047, each word of 64 bits. Scan data containing more than 128 image lines or more than 8 transducer elements would require larger memories.

As shown in FIGS. 2 and 3, after the INIT, the Data Select bit (0) is set which increments the three bit counter 32 to 000 and sets the Scan Memory 44 address at 00000000000, the address of the sine/cosine word of image line #1. The Scan Memory 44 is cycled by the Data Select bit through OR gate 50 after a suitable delay 54 $\Delta \tau 2$, and the Scan memory data is passed to the sin/cos latch 70. Simultaneously with the Data Select bit (0), the sine/cosine bit (s/c) is set. After a suitable delay 52 $\Delta \tau 7$, the sine/cos Latch 70 is cycled and the 8 MSB's, the sine word, moves to the sine D/A converter 72 while the next 8 MSB's, the cosine word, moves to the cosine D/A converter 76. After further suitable delay 68 $\Delta \tau 8$, the D/A converters are cycled and the sine and cosine data are sent as an analog voltage levels to the input of the sine $\theta$ integrator 74 and cosine $\theta$ integrator 78.

On the following clock pulse, the Data Select bit (1) is set again as shown in FIG. 3. The Scan memory address now corresponds to that of the transmit control data of the first image line, and this transmit control data is passed to the Tx/Rx Latch/MPX 66 after delay 54 $\Delta \tau 2$. After a further short delay 56 $\Delta \tau 3$, the TX/Rx Latch/MPX 66 is cycled and the data passes to its next destination depending on the direction of the Tx/Rx Latch/MPX 66. The direction of the Tx/Rx Latch/MPX 66 is determined by the Transmit bit of the Timing ROM 34 which is set to initiate the transmit acoustic burst simultaneously with Data Select (1). This bit is sent to the Tx/Rx Latch/MPX 66. If the bit is set, the direction of TX/Rx Latch/MPX data flow is such that the data are sent to the 8 Transmit Down Counters 64. Eight bits of data per Down Counter are loaded at the time of the Data Select bit after delay 62 $\Delta \tau 9$.

Figure 5B:
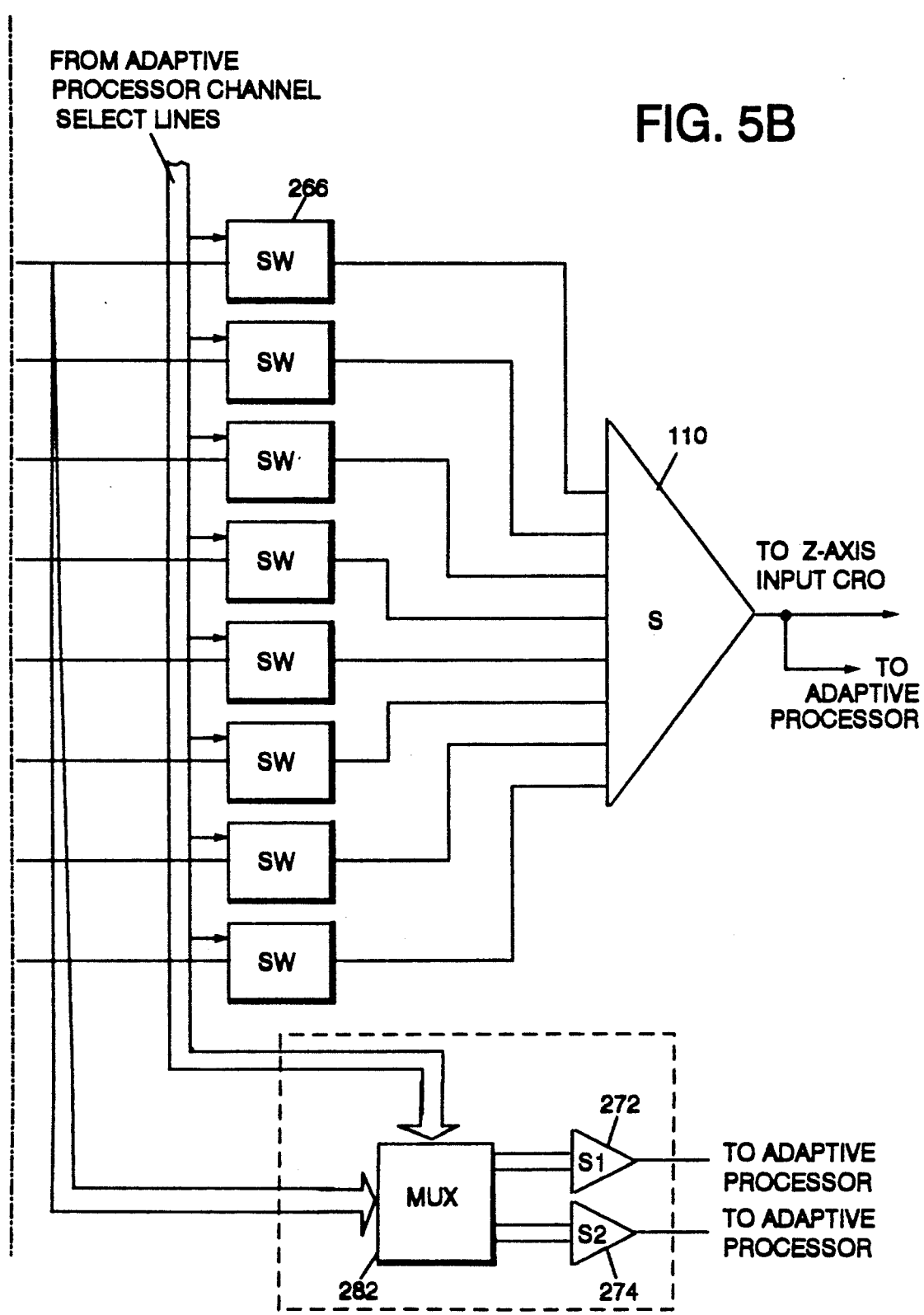

The Transmit bit of the Timing ROM 34 also forms one input to AND gate 60 suitably delayed by delay 58 $\Delta \tau 5$ so as to occur after delay 62 $\Delta \tau 9$. The master clock pulses form the second input to AND gate 60 whose output serves as the clock for the down counters 64 so that they now begin to count down at 24.8 MHz. As each counter reaches zero, it sends the properly timed transmit trigger pulse to its respective transmitter circuit (T) shown in the Signal Processor 20 (FIG. 5). The transmit bit also resets the sine/cosine integrators 74 and 78 so that they initiate their operation at the time of the ultrasonic transmit burst. The outputs of the integrators pass to the X and Y inputs of the Cathode Ray Oscilloscope 22 and provide the deflection voltages for the display of the sector scan format.

As shown in FIG. 3, at the completion of the transmit process, the Tx bit goes low, the Data Select bit is set again so that the Scan Memory receive data for the first focal zone now passes through the Tx/Rx Latch/MPX 66, which has been switched to permit data flow to the Signal Processor 20. Thus, the 64 bits of the receive data now pass to the control inputs of delay lines (D) of the Signal Processor 20. After a predetermined time, all the echo data from the first focal zone has been received by the imaging system, the Data Select bit is again set and the 64 bit delay line control data for the second receive mode focal zone passes to the Signal Processor 20. As shown in FIG. 3, this process continues for 6 focal zones, Data Selects (2)–(7). When all the echo data from distances out to the predetermined maximum range have been received by the imaging system, the Receive Complete bit is set in the Timing ROM 34. The Rx Complete bit increments the 7 bit image line counter 36 and the three bit counter 32 through OR gate 50. The output of the 3 bit counter 32 is now 000. The address of the Scan memory 44 is now 8, the first word of the scan memory 46 second block. Simultaneously the second sine/cosine bit is set. Shortly thereafter, the Tx bit is set for the second time and the acoustic burst is transmitted for the second image line of echo data acquisition.

These operations are continued until the 128 image lines of the frame are obtained. At that time, the address of the Timing ROM Address Counter 40 overflows to repeat the following image frame.

SIGNAL PROCESSOR

FIG. 5 is a schematic of the Signal Processor 20. The figure shows the eight transducer elements 102 of the phased array 10 and the eight associated transmitters (T) 104. During the imaging process, the correct transmit timing pulses are sent in parallel to the transmitter 104 from the transmit down counters 64 of the MC 18. The image line echoes return in parallel through the amplifiers (A) 106 to delay lines (D) 108. The amplifiers 106 include the normal capabilities of time gain compensation and/or non-linear amplification (logarithmic compression). The lengths of the delay lines 108 are determined by the receive mode scan memory data of MC 18. The delay lines 108 may be analog or digital. The output of the delay lines 108 go to switches 266 where the adaptive group memory 264 in adaptive processor 16 has selected which transducer array elements to include as inputs to summing amplifier 110. For the conventional mode of operation the data from all of the transducer array elements in the system would be included as inputs to summing amplifier 110. This amplifier 110 includes the normal operations of video processing in a phased array imaging system including detection, filtering and video amplification. The output of the amplifier 110 (S) is sent to the Z-axis input of the Cathode Ray Oscilloscope 22 for display. Alternatively the display operation can be accompanied by analog or digital scan conversion.

ADAPTIVE MODE OPERATION

Figures 6, 6A:
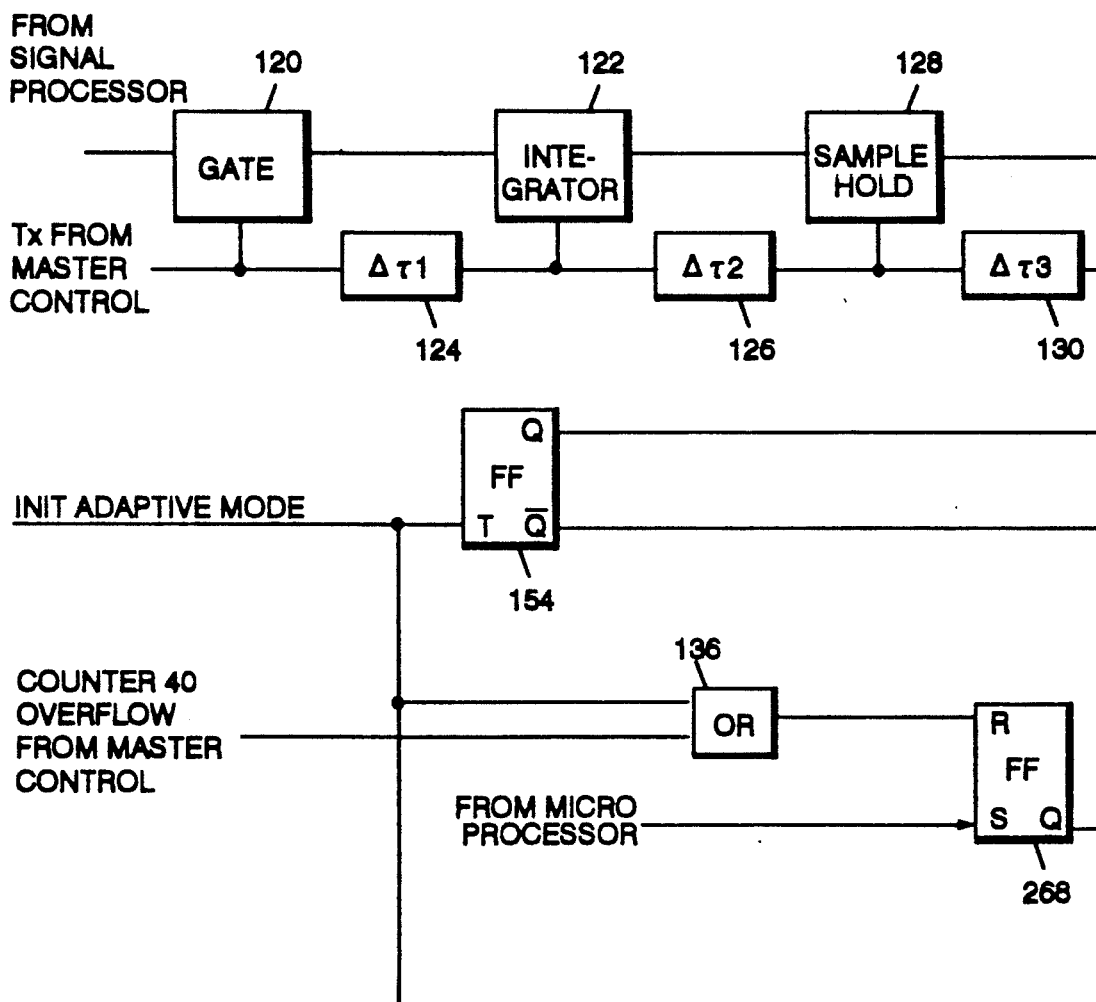
FIG. 6, 6A and 6B are a schematic representation of the adaptive processor according to the present invention.
Figure 6B:
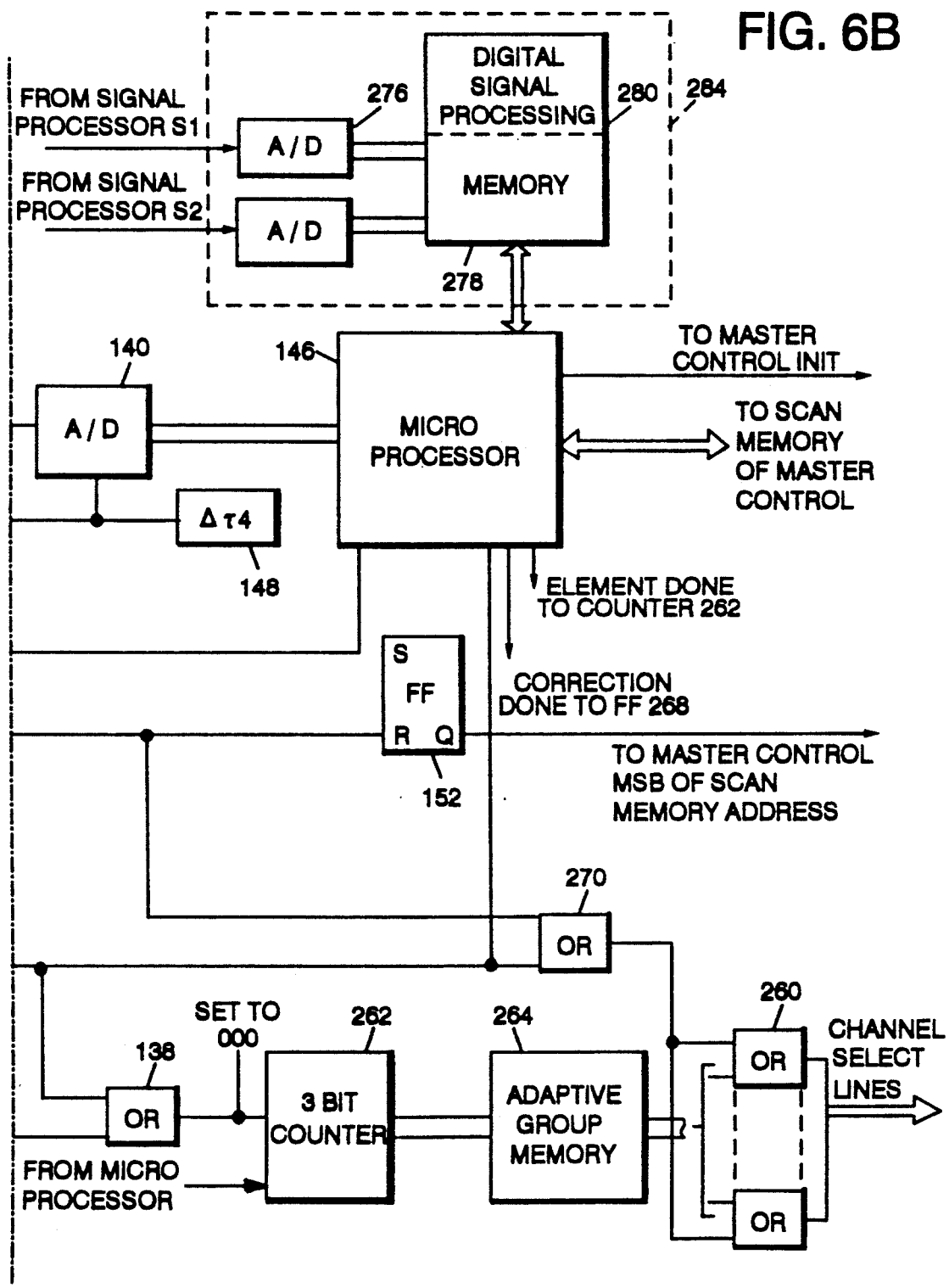

The phased array imaging system initiates adaptive mode operation at the push of a button on the transducer by the operator when he has positioned the ROI window 24 over a patch of tissue parenchyma texture by moving the transducer laterally and adjusting the gate to a desired range. When adaptive processing is initiated the Adaptive INIT begins the operation of the microprocessor in the Adaptive Processor 16 by setting flip-flop 154 as shown in FIG. 6. Flip-flop 154 also sets 3 bit counter 262 to 000 and resets flip-flop 268. The microprocessor 146 in turn suspends operation of the conventional phased array scanning by reinitializing the Master Control 18 through OR gate 30 after a short delay for initializing the microprocessor 146. At this time, operation of the adaptive mode begins as described below with reference to the Flow Chart in FIG. 7.

The Adaptive Processor uses the normal sequence of the Timing ROM 34 and Scan Memory 46 to obtain the first image line of Scan Memory 46. However, it should be noted that line #1 stored in Scan Memory 46 has been assigned to the first line of the image which crosses the ROI 24 in the sector scan of FIG. 1. The flexibility of a phased array system enables the image lines to be obtained in any order. The echo signal output of the summer/detector 110 S of the Signal Processor 20 passes to the Adaptive Processor 16 in parallel to its path to the CRO 22. In Adaptive Processor 16 the echo signal from image line #1 passes through the adjustable range gate 120 which is triggered by the Tx pulse from the Timing ROM 34 of MC 18. The gate is set so that it contains only the target range within the ROI 24.

The output of the gate 120 then is integrated by integrator 122 after delay 124 $\Delta \tau 1$ and the integral value over the gate 120 is stored in the sample/hold 128 after delay 126 $\Delta \tau 2$ and digitized in the A/D converter 140 after delay 130 $\Delta \tau 3$ and then stored after delay 148 $\Delta \tau 4$ in an accumulator (not shown) of the microprocessor 146. The complete operation takes place during the normal round-trip transit time of the ultrasound echo using the conventional timing of the Timing ROM 34 of MC 18. The operation is then repeated for each independent image line (spaced one lateral resolution cell apart) in the ROI 24. In this example, five lines are obtained in the ROI 24 as shown in FIG. 1 requiring approximately 2 msec, assuming a maximum image range of 15 cm. Thus, an average image brightness of the five image lines within the ROI 24 is accumulated and stored in register B1 (not shown) of the microprocessor 146.

When the final line of the ROI 24 is obtained, the microprocessor 146 sets the Init bit again, reinitializing the Master Control 18. The bit is held while the microprocessor implements the memory update of the ROI image lines. The Tx/Rx 64 bit data words of each of the five ROI image lines for the focal zones within the range gate 120 are sent to the microprocessor 146 from Scan memory 46 of the MC 18. For element #1 of each word a new delay is added to the total delay (which would be one bit for D=1). In the illustration, the one bit delay size is determined by the minimum delay of the Signal Processor Delay lines 108. Typical values for D range from one-eighth to one-twentieth of the wavelength of the center frequency of the transducer. One-eighth wavelength is used for this example.

The new phase delay words are then moved back to the MC 18 and to their equivalent addresses in Scan memory 48, simultaneously updating the transmit and receive words. If one assumes a transmit word and 3 receive mode focal zone words for the 5 ROI image lines, the total memory transfer and update time for array element #1 would require approximately 10 μsec for a 8 MHz cycle time microprocessor. When the 1 bit, 1 element memory update is completed, the microprocessor 146 sets the flip-flop 152 of the Adaptive Processor 16 whose Q output sets the most significant bit of the MC Scan Memory 44 so that the scanner uses Scan Memory 48 for the subsequent image lines. The microprocessor 146 also releases the adaptive Init bit so the Timing ROM 34 proceeds again to acquire the 5 ROI image lines using the modified data of scan memory 48. Once the most significant bit of the MC Scan Memory 44 is set, the corrected data is used for subsequent correction of elements in adaptive mode and for correction of the Tx/Rx control data in normal mode of operation. The new average image brightness is stored in register B2 (not shown) and compared to the original value in B1. If the new brightness in B2 exceeds the original image brightness, the adaptive processor 16 is moving in the right direction. The Tx/Rx phase delays for element #1 continue to be increased by 1 bit increments (D=D+X, X=1) until the new brightness is less than the previous value, i.e., B2<B1. This indicates that the proper phase delay for element #1 to maximize ROI image brightness has been found. This optimum delay increment D is then added to Scan Memory Data #1 for element #1 for all the image lines in the IPP 14 by moving them to the microprocessor 146 and returning them to Scan Memory 48.

If the Scan Data update for delay increase is immediately moving in the wrong direction (B2<B1, D=1, X=1), the direction of the data modification of element #1 is switched to delay decrease (D=−1, X=−1). The delay update and brightness measurement is now repeated until the maximum brightness is found and the phase delay data is modified for the IPP 14 for element #1. Assuming the worst case for element #1 of moving one step (D) in the wrong direction followed by four necessary steps in the right direction (D=−4) then that process will require six Tx/Rx cycles of 5 ROI lines, requiring 12 msec total, plus the memory update of 100 ROI and IPP image lines which requires a total of 1 msec. The total adaptive processor time for element #1 is 13 msec. A worst case total time for the adaptive processor 16 to correct the phase delays of all eight elements throughout the IPP 14 is approximately 100 msec.

Every time the micro-processor 146 determines the optimum phasing for an element, it sends a clock pulse to three bit counter 262. The three bit counter 262 increments addresses for the adaptive group memory 264. This memory contains a map of the transducer array elements to be included in the summing amplifier 110 for calculating the average maximum brightness in the ROI. Each memory location in 264 contains 8 bits, one for each transducer array element. Sending a logic high to switches 266 in FIG. 5 allows the data from that transducer array element to be included in summing amplifier 110. In conventional mode, the output from FF 154 is high and the outputs from OR gates 260 are high so data from all of the transducer array elements in the system are included in the sum 110. In adaptive mode, however, only the transducer array elements stored in adaptive group memory 264 are included in sum 110. This allows a preselected subset of all of the transducer array elements to be included in the sum when calculating the best phasing for each element. The data in adaptive group memory 264 is calculated off-line and preloaded into the system. FIG. 8 shows a typical transducer array element map. In this example, Element #1's optimum phasing is determined using data from all of the transducer array elements. Element #2's phasing, however, is determined using only its own data and data from the previously corrected transducer array element #1. The phasings for the remainder of the elements are determined using their own data and data from up to three of the most recently corrected transducer array elements. This is only one of many possible implementations, for example, a combination of corrected and uncorrected data could be used to correct elements until sufficient corrected data was available to use only corrected data. The inventors have experimental and simulation data for a two dimensional array which indicate that using data from the elements with previously corrected phasings within a radius of about one quarter of the aperture performs best, but other radii also perform well. FIG. 9 illustrates a typical group of elements 294 that could be selected while correcting the phase at one element 292 in a two dimensional array 290. The elements included in reference group 294 have had their phases previously corrected and lie within a radius of about one quarter of the array.

Once the phasing has been corrected at all of the elements, the microprocessor 146 puts a high signal on the Master Control Init line and the Correction Done line which return the system to conventional mode, albeit using the now corrected phase delay data of upper scan memory 48. The Correction Done line also sets FF 268 high which sets OR 270 high. This selects all of the transducer array elements so data from all of the transducer array elements are used when scanning in the conventional mode.

The Master Control 18 then proceeds to form a complete 128 line image using the corrected data in Scan Memory 48. Once the last line in the new image has been completed the Timing ROM Address Counter 40 overflows which resets FF 268 and initiates a new adaptive processing cycle. The system continues alternating between forming optimized conventional images and correcting in adaptive mode until the operator pushes the adaptive init button again. Pushing this button toggles FF 154 back to the reset mode which returns the system to conventional operation and resets FF 152 which sets the MSB low and returns the system to using the uncorrected data in Scan Memory 46.

Figure 7:
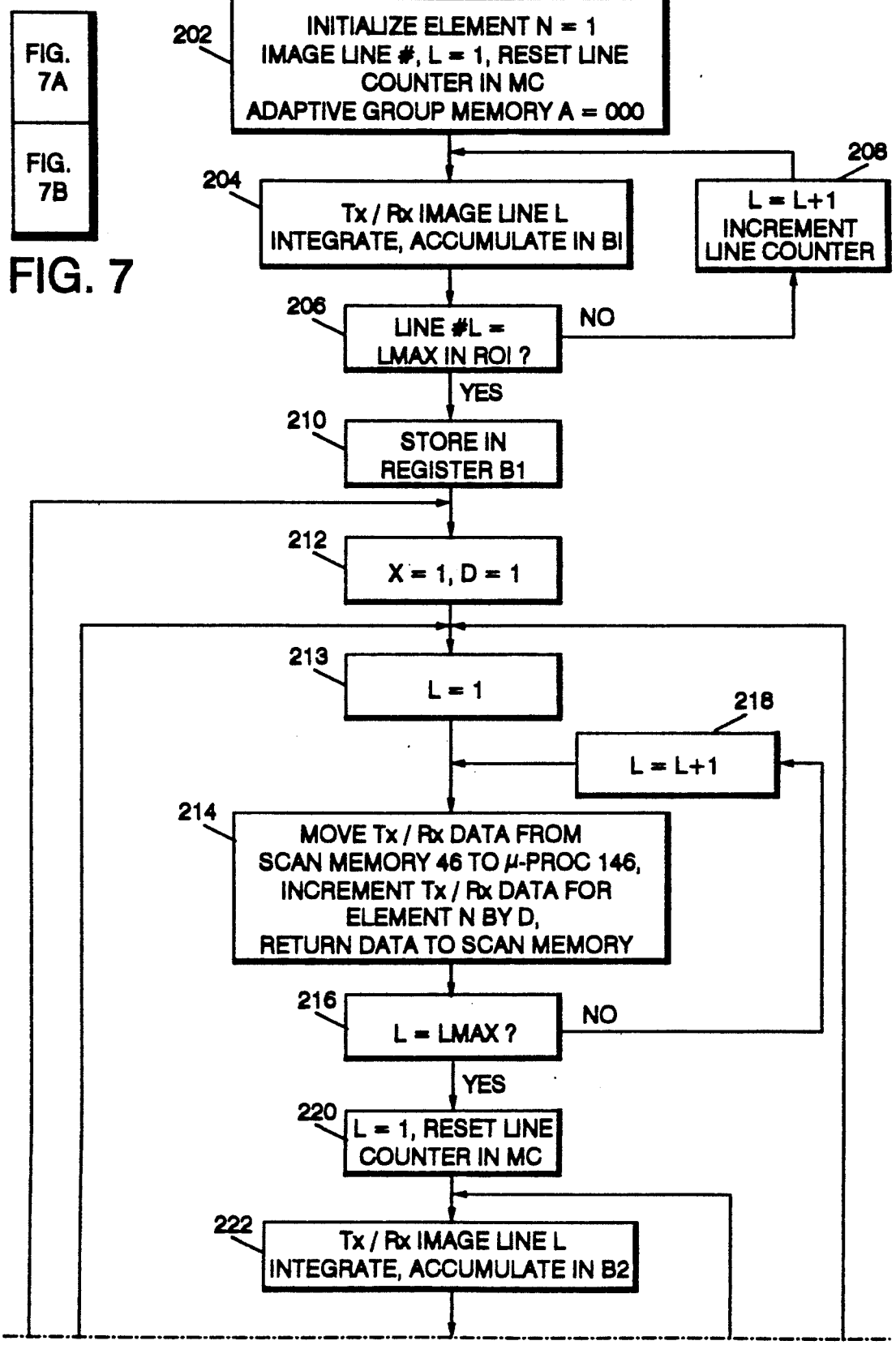
Figure 7B:
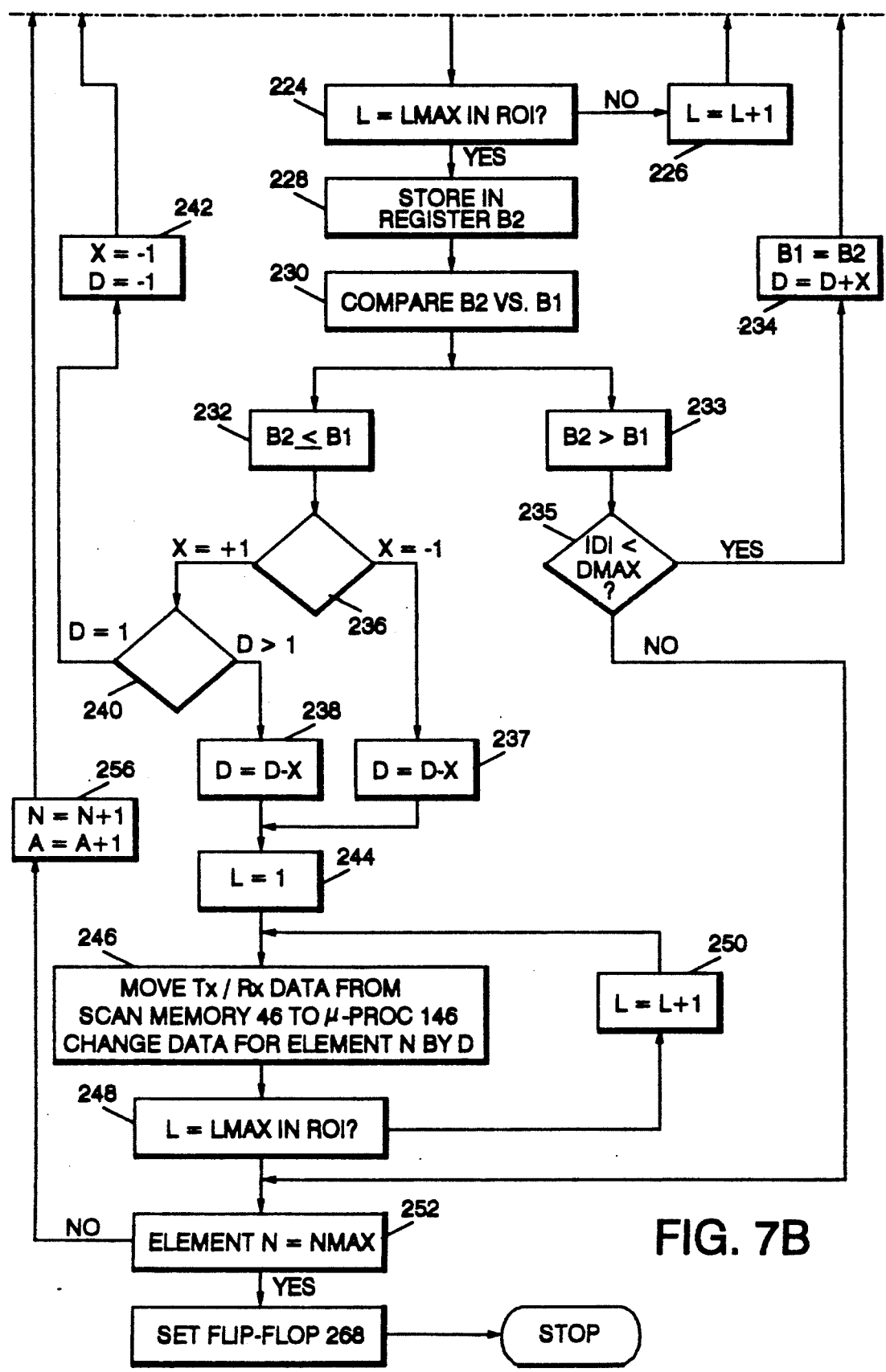

The Flow Chart shown in FIG. 7 will now be described. In general terms, in order to determine the optimum delay value that yields the brightest average image, the delay associated with each element in turn, is changed in increments of +1 or −1. For example, a delay increment of +1 is used at first. The average brightness for the ROI is determined and the total delay is incremented by +1 for element #1 if the region of interest is brighter. If the image is brighter, the delay is then incremented until the picture becomes dimmer. At that point, the maximum average image brightness has been reached, and the previous total delay value is used as the scan data for that element. If the second average image brightness is dimmer than the first, the delay is moving in the wrong direction. The delay increment is changed to −1 and is continually incremented by −1 until the maximum average image brightness is determined. In other embodiments of the present invention, the increment in delay could be larger, smaller or varied to minimize the number of iterations before the optimum delay is achieved. For example, a coarse delay modification could initially be used and then a more fine delay modification used to arrive at a precise determination of the optimum delay. As will be recognized by one of skill in this art, this process may be used with any number of delay adjustment values to minimize the time to determine the optimum correction value.

Referring now to the flowchart, when the adaptive processing mode is started, the element number N is initialized to 1, the image line number L is initialized to 1, the first line in the region of interest, the line counter in the Master Control is reset at step 202 and the 3 bit counter 262 is reset to address Adaptive Group Memory 264 A=000. At step 204, after the transmit/receive operation in image line L the returning echo signal is integrated and accumulated in register B1. At step 206, it is determined whether the line number L is the maximum in the ROI. If not, at step 208 the line counter is incremented and control returns to step 204. If the last line in the ROI has been reached, the brightness is stored in register B1 at step 210.

At step 212, X and D are set to 1. At step 213, L is set to 1, and at step 214 the Tx/Rx control data from Scan Memory 46 are moved to the microprocessor. Tx/Rx control data are incremented for element N by D and the data is returned to Scan memory 48. At step 216 it is determined whether the last line in the ROI has been reached, If not the line counter is incremented at step 218 and control is returned to step 214.

After the last line in the ROI has been reached (step 216), the line counter L is reset to 1 (step 220). At step 222, the image line L data is integrated and accumulated in register B2. At step 224, it is determined whether the last line in the ROI has been reached. If not, the line counter is incremented (step 226) and control is returned to step 222.

After all lines have been processed, the value is stored in register B2 at step 228. At step 230, B2 is compared with B1.

At step 233, if B2 is greater than B1 and the absolute value of D is less than DMAX in step 235, the adaptive processor is still moving in the correct direction and the average image brightness is still increasing. A typical value for DMAX might be one wavelength, but it can be chosen as smaller than this to speed up processing or larger than this to improve the accuracy of the compensating phase.

At step 234, B1 is set to B2 and D is incremented by X. Control then returns to step 214 to remeasure the image brightness using the incremented D value.

At step 232, B2 is found to be less than or equal to B1, indicating that the average image brightness has not increased. If X equals −1 (step 236) D is set to D+1 (step 237) and control passes to step 244. If X equals +1 (step 236) and D= +1 (step 240), D and X are both set to −1 (step 242) and control passes to step 214. Otherwise, D>1 so D is set to D−1 (step 238) and control passes to step 244, where L is set to 1. At step 246, the Tx/Rx control data from Scan memory 46 is moved to the microprocessor and the data for element N is changed by D. At step 248 it is determined whether L is equal to the maximum lines in the ROI. If not, L is incremented at step 250. If so, and if at step 252, N is equal to the maximum number of elements, then flip flop 268 is set and adaptive processing stops. Otherwise at step 256, N is incremented, Adaptive Group Memory address A is incremented and control returns to step 212.

Of course, the Adaptive Processor can operate with more complexity. Tolerance limits can be placed on the brightness comparison of B2 or B1 to account for noise and drift in the brightness measures. Arrays of greater than eight elements require more time to correct. Phase delays of groups of elements can be corrected together to shorten processing time and to correct transducer aberration functions of long correlation lengths. Phase increment (X) of larger size can be used to speed up the process. When larger phase increments are used, methods of interpolation between two values, known to one of skill in this art, could be used to increase precision. The phase starting point for the correction for element N+1 could be set depending on the best correction for element N. Using a fixed location for the ROI window in an image is the simplest implementation, but moveable ROI windows can be implemented using cursors. A check routine can be added to monitor phase corrections of greater than one wavelength. Another routine can be added to remove the linear component of the extracted phase aberration profile and remove introduced steering errors. Microprocessors are now available operating at 33 MHz or higher (30 nsec cycle times or less) which can be used to shorten the memory updates significantly. Parallel receive mode processing, which has been developed for ultrasound scanning, acquires many image lines (up to 16) for a single transmitted ultrasound pulse (See Pavy et al., 1991). This would significantly reduce pulse-echo time of flight at some compromise in signal to noise ratio.

The size of the ROI and number of image measurement lines affects the signal to noise ratio of the brightness measurement. The severity of the transducer phase aberration determines the necessary size of the ROI and the available size of the IPP. For Adaptive Processors operating at maximum speed, the adaptive operation could be carried out on each image frame for several IPP's to correct the phase aberrations of the entire sector image in real time. Other image sharpening quality factors could be used instead of image brightness. These include the image intensity raised to any power. Although the ROI in FIG. 1 is shown to consist of five lines, as few as one line can be used where a longer gate length is used to assure adequate signal to noise ratio.

The inventors have evidence that two dimensional arrays will be necessary to more thoroughly remove the effects of phase aberration (see Trahey, 1991). The present invention is readily extendable to two dimensional geometries by simply designing the system to have selectable elements in both dimensions. The one dimensional example described and other one dimensional techniques can then be extended to two dimensions by selecting the data from elements that lie within a radius in both dimensions as in FIG. 9, or even using different radii in each dimension.

There is a final alternate implementation of this system as shown by the Digital Signal Processing chip 280 as shown in the dashed box in FIG. 6. This implementation shows how using only selected transducer array elements can be used to improve the performance of any phase correction technique like O'Donnell et al.'s and Hassler et al.'s cross-correlation technique, O'Donnell and Engeler's CORDIC Processor (1990), zero-crossing (Flax and Webster, 1970), auto-correlation (Kasai, 1985), frequency domain (O'Donnell, 1992), sum absolute difference (SAD) (Bohs and Trahey, 1991), Fourier transform techniques (Kontis, 1987), one-bit correlation (Bonnefous, 1989), or any technique that uses phase or timing registration known to one of skill in this art. In this implementation, the data passes through multiplexers 282 in FIG. 5, controlled by Adaptive Group memory 264, which can select to send the data to a correction sum 272, a reference sum 274 or not to be included. If transducer array element N is having its phase corrected, its data is selected to go to correction sum 272 and transducer array elements N−1 to N−K and/or elements N+1 to N+J are selected to go to reference sum 274. Summing amplifiers 272 and 274 do not rectify and envelope detect the data like S 110, they just amplify and sum the selected signals. The outputs from 272 and 274 are then sent to A/Ds 276 and read into memory 278 of Digital Signal processor 280 in FIG. 6. This DSP chip 280 then performs a phase correction technique such as those listed above, and sends the phase information to microprocessor 146. Digital signal processing chips are now available, such as Texas Instrument's 320C30, that can accomplish these computations at equivalent rates to the maximum average brightness implementation. The important concept is that the performance of any of these phase correction algorithms is significantly improved by the use of selected transducer array elements chosen by the adaptive group memory especially an adjacent group of already corrected elements.

This alternate implementation can also be used to speed up the implementation of the mean speckle brightness technique. By storing the digitized data in the memory 278 a brightness can be calculated for several different phasings of the element being corrected and the best phasing can be determined from only one scan of the ROI. Alternatively, the phasing can be adjusted at several elements in an array for each scan of the ROI and a separate brightness can be calculated for each of these groups, thereby correcting the phasings at more than one element at a time. Furthermore, by using more parallel data paths than the two shown here, these two types of parallelism can be combined for additional improvements in speed.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning in range of equivalents of the disclosed embodiments. It is to be understood that the phraseology or terminology employed herein is for the purpose of description and not of limitation.

The foregoing is illustrative of the present invention, and is not to be construed as limiting thereof. The invention is defined by the following claims, with equivalents of the claims to be included therein.

That which is claimed is:

1. A method of ultrasonic imaging utilizing an ultrasonic transducer array having a plurality of transducer elements, said method comprising the steps of:
   (a) receiving a first set of phased array echo data corresponding to a region of interest in the scan from said ultrasonic transducer array wherein each member of said set of phased array echo data corresponds to one of said plurality of transducer elements;
   (b) calculating an optimal phase aberration correction for all elements of said transducer array from phased array echo data from a preselected subset of said transducer array elements specific to each of all said elements; and
   (c) correcting a subsequent set of phased array scan control data for said ultrasonic transducer array with said optimal phase aberration correction.

2. The method according to claim 1, wherein steps (a) and (b) are performed to obtain said optimal phase aberration correction prior to obtaining a plurality of phased array images.

3. The method according to claim 1, wherein the phased array scan control data comprises transmit/-receive phase delay data.

4. The method according to claim 1, wherein said calculating step comprises determining the phase aberration correction using a method selected from the group comprising cross correlation, zero crossing, autocorrelation, frequency domain, sum absolute difference, Fourier transform and one-bit correlation.

5. A method of ultrasonic imaging utilizing an ultrasonic transducer array having a plurality of transducer elements, said method comprising the steps of:
   (a) receiving a first set of phased array echo data corresponding to a region of interest in the scan from said ultrasonic transducer array wherein each member of said set of phased array echo data corresponds to one of said plurality of transducer elements;
   (b) calculating an optimal phase aberration correction for each element of said transducer array with data from a preselected subset of said transducer array elements specific to said element by the following steps:
      (i) determining the phase aberration correction data for a first element of said ultrasonic array using phased array echo data from a subset of said transducer array elements to provide a first corrected element set; and then,
      for each subsequent element of said transducer array,
      (ii) determining the phase aberration correction data for said subsequent element using data corresponding to a preselected subset of said transducer array elements specific to said subsequent element and selected from the group comprising said corrected element set and uncorrected transducer array elements;
      (iii) updating said corrected element set to include the phase aberration correction data for said subsequent element; and then
   (c) correcting a subsequent set of phased array scan control data for said ultrasonic transducer array with said optimal phase aberration correction.

6. The method according to claim 5, wherein said calculating step further comprises the steps of:
   (a) measuring the average brightness in the region of interest using echo data from a first selected subset of said transducer elements;
   (b) adjusting phased array scan control data for a first element of said ultrasonic transducer array;
   (c) obtaining a value representing the average image brightness of the region of interest responsive to the phased array scan control data using data from said first selected subset of said transducer elements;

(d) repeating steps (a) through (c) until a maximum average image brightness has been reached for said first element to obtain a corrected phased array scan control data for said element to provide a first corrected element set; and then, for each subsequent element of said transducer array, (e) measuring the average brightness in the region of interest using data corresponding to a preselected subset of said transducer array elements specific to said subsequent element and selected from the group comprising said corrected element set and uncorrected transducer array elements;

(f) adjusting phased array scan control data for said subsequent element;

(g) obtaining a value representing the average image brightness of the region of interest responsive to said corrected element set and the adjusted phased array scan control data for said element;

(h) repeating steps (e) through (g) until a maximum average image brightness has been reached for said subsequent element to obtain phase aberration correction data for said element.

7. The method according to claim 5, wherein said preselected subset of said transducer array elements comprises transducer array elements whose distance from said element is not greater than ¼ the aperture of said transducer array.

8. The method according to claim 5, wherein said preselected subset of said transducer array elements is determined by the minimum uncertainty in the measurement of the phase difference between the echo data of each element and the sum of the echo data of the specific subset of said transducer array elements.

9. The method according to claim 5, wherein said determining steps comprise calculating the phase aberration correction using a method selected from the group comprising speckle image brightness, cross correlation, zero crossing, auto-correlation, frequency domain, sum absolute difference, Fourier transform and one-bit correlation.

10. The method according to claim 5, wherein steps (a) and (b) are performed to obtain said optimal phase aberration correction prior to obtaining a plurality of phased array images.

11. An ultrasonic phased array imaging system having a normal mode and an adaptive mode of operation, said system comprising;
a transducer array, having a plurality of elements and electronic circuits, for recording echo data from a region of interest from an image;
adaptive means for adjusting phased array scan data associated with each element of the transducer, said adaptive means comprising:
(a) calculating means for determining an optimal phase aberration correction for all elements of said transducer array from phased array echo data from a preselected subset of said transducer array elements specific to each of all said elements; and
(b) correcting means for updating a subsequent set of phased array scan control data from said ultrasonic transducer array for said region of interest with said optimal phase aberration correction; and
means for entering the normal mode of operation.

12. An ultrasonic phased array imaging system, said system having an adaptive mode and a normal mode comprising;
a transducer array having a plurality of elements for generating phased array echo data representing an image;
data path control means for providing phased array echo data from a selected subset of said transducer array elements specific to each of said elements to said adaptive processor;
an adaptive processor for adapting phased array echo data for each element to provide corrected phased array echo data for each element of said transducer array for a region of interest in said image;
a master control for regulating the imaging system when operating in the normal mode;
signal processors for processing the phased array echo data received from said transducer; and
display means for displaying said processed signals.

13. The system according to claim 12, wherein said adaptive processor comprises:
a first flip-flop for initiating adaptive processor operations;
means for determining which of said transducer array elements are included in said selected subset for adaptive processing;
correction means for calculating the phase aberration corrections for the phased array scan control data for each element;
means for updating the phased array scan control data for the region of interest using the phased array scan control data which produced the optimum phase aberration correction.

14. The system according to claim 13, wherein said means for determining further comprises means for selecting between phased array data from uncorrected elements and phased array echo data from corrected phased elements of said transducer array to provide corrected phased array scan control data to said adaptive processor when said corrected phased array scan control data has been determined for an element.

15. A method of ultrasonic imaging utilizing an ultrasonic transducer array having a plurality of transducer elements, said method comprising the steps of:
receiving a first set of phased array echo data corresponding to a region of interest in the scan from said ultrasonic transducer array wherein each member of said set of phased array echo data corresponds to one of said plurality of transducer elements;
calculating an optimal phase aberration correction for all elements of said transducer array with phased array echo data from a preselected subset of said transducer array elements specific to each of all said elements by maximizing average image brightness for said region of interest using phased array echo data for said preselected subset of said transducer array elements; and
correcting a subsequent set of phased array scan control data for said ultrasonic transducer array with said optimal phase aberration correction.

16. The method according to claim 15, wherein said preselected subset of said transducer array elements comprises transducer array elements whose distance from said element is not greater than ¼ the aperture of said transducer array.

17. The method according to claim 15, wherein said preselected subset of said transducer array elements is determined by the minimum uncertainty in the measurement of the phase difference between the echo data of each element and the sum of the echo data of the specific subset of said transducer array elements.

18. A method of ultrasonic imaging utilizing an ultrasonic transducer array having a plurality of transducer elements, said method comprising the steps of:

receiving a first set of phased array echo data corresponding to a region of interest in the scan from said ultrasonic transducer array wherein each member of said set of phased array echo data corresponds to one of said plurality of transducer elements;

calculating an optimal phase aberration correction for all elements of said transducer array from phased array echo data from a preselected subset of said transducer array elements specific to each of all said elements;

correcting a subsequent set of phased array scan control data for said ultrasonic transducer array with said optimal phase aberration correction; and wherein said calculating step comprises the steps of:

(a) determining the phase aberration correction data for a first element of said ultrasonic array using phased array echo data form a subset of said transducer array elements to provide a first corrected element set; and then, for each subsequent element of said transducer array, (b) determining the phase aberration correction data for said subsequent element using data corresponding to a preselected subset of said transducer array element specific to said subsequent element and selected from said corrected elements set;

(c) updating said corrected element set to include the phase aberration correction data for said subsequent element.

19. A method of ultrasonic imaging utilizing an ultrasonic transducer array having a plurality of transducer elements, said method comprising the steps of:

receiving a first set of phased array echo data corresponding to a region of interest in the scan from said ultrasonic transducer array wherein each member of said set of phased array echo data corresponds to one of said plurality of transducer elements;

calculating an optimal phase aberration correction for all elements of said transducer array from phased array echo data from a preselected subset of said transducer array elements specific to each of all said elements;

correcting a subsequent set of phased array scan control data for said ultrasonic transducer array with said optimal phase aberration correction; and wherein said calculating step further comprises the steps of:

(a) measuring the average brightness in the region of interest using echo data form a first selected subset of said transducer elements;

(b) adjusting phased array scan control data for a first element of said ultrasonic transducer array;

(c) obtaining a value representing the average image brightness of the region of interest responsive to the phased array scan control data using data from said first selected subset of said transducer elements;

(d) repeating steps (a) through (c) until a maximum average image brightness has been reached for said first element to obtain a corrected phased array scan control data for said element to provide a first corrected element set; and then, for each subsequent element of said transducer array, (e) measuring the average brightness in the region of interest using data selected from said corrected element set and said subsequent element;

(f) adjusting phased array scan control data for said subsequent element;

(g) obtaining a value representing the average image brightness of the region of interest responsive to said corrected element set and the adjusted phased array scan control data for said subsequent element;

(h) repeating steps (e) through (g) until a maximum average image brightness has been reached for said subsequent element to obtain phase aberration correction data for said subsequent element;

(i) updating said corrected element set to include said subsequent element.

20. The method according to claim 19, wherein said adjusting step further comprises the steps of:

comparing a recently obtained average image brightness value to a previous average image brightness value obtained in the immediately previous iteration of steps (a) through (c) for said first element and steps (e) through (i) for said subsequent elements;

if the recently obtained average image brightness value is less than the previous image brightness value, decreasing the phase delay data indicating maximum average image brightness has been reached; and if the recently obtained average image brightness value is greater than the previous image brightness value, increasing the phase delay data indicating maximum average image brightness has not been reached.

21. An ultrasonic phased array imaging system having a normal mode and an adaptive mode of operation, said system comprising:

a transducer array, having a plurality of elements and electronic circuits, for recording echo data from a region of interest from an image;

adaptive means for adjusting phased array scan data associated with each element of the transducer, said adaptive means comprising:

(a) calculating means for determining an optimal phase aberration correction for all elements of said transducer array from phased array echo data from a preselected subset of said transducer array elements specific to each of all said elements.

(b) correcting means for updating a subsequent set of phased array scan control data from said ultrasonic transducer array for said region of interest with said optimal phase aberration correction;

(c) selection means for selecting said preselected subset of said phased array echo data corresponding to each of said plurality of transducer elements to include elements whose phase aberration has been corrected;

(d) correction means for determining the phase aberration correction data for a first element of said ultrasonic array form said phased array echo data to provide a first corrected element set, said correction means further comprising means for determining the phase aberration correction data for subsequent elements of said transducer array with preselected data corresponding to each of said subsequent elements selected from the group comprising said corrected element set and data from uncorrected elements of said transducer array; and (e) means for updating said corrected element set to include the phase aberration correction data for said subsequent elements; and means for entering the normal mode of operation.

22. An ultrasonic phased array imaging system having a normal mode and an adaptive mode of operation, said system comprising:

a transducer array, having a plurality of elements and electronic circuits, for recording echo data from a region of interest from an image;

adaptive means for adjusting phased array scan data associated with each element of the transducer, said adaptive means comprising:

(a) calculating means for determining an optimal phase aberration correction for all elements of said transducer array from phased array echo data from a preselected subset of said transducer array elements specific to each of all said elements; and (b) correcting means for updating a subsequent set of phased array scan control data from said ultrasonic transducer array for said region of interest with said optimal phase aberration correction; and means for entering the normal mode of operation; and wherein said calculating means and said correction means comprises:

means for incrementing the phased array scan control data for the element;

(ii) averaging means for obtaining a value representing the average image brightness of phased array echo data from a preselected subset of said transducer array elements for the region of interest corresponding to each of said plurality of transducer elements and responsive to the phased array echo data;

(iii) selection means for selecting said preselected subset of said transducer array elements specific to each of said plurality of transducer elements;

(iv) determining means for determining when a maximum average image brightness has been achieved; and (v) means for updating the phased array scan control data for the region of interest using the phased array scan control data for each element which produced the maximum average image brightness.

23. The apparatus according to claim 22, wherein said region of interest comprises at least a portion of one image line and said averaging means comprises imaging means for obtaining a value representing the average image brightness for the region of interest.

24. The apparatus according to claim 23, wherein the phased array scan data comprises transmit/receive phase delay data.

25. The apparatus according to claim 22, wherein said adaptive means further comprises determining means for determining when a maximum average image brightness has been reached for each element, said determining means comprising;

comparing means for comparing a recently obtained average image brightness value to the immediately previous average image brightness value obtained;

subtracting means for decreasing the phase delay data responsive to the recently obtained average image brightness value being less than the immediately previous image brightness value; and adding means for increasing the phase delay data responsive to the recently obtained average image brightness value being greater than the previous image brightness value.

* * * * *

UNITED STATES PATENT AND TRADEMARK OFFICE
CERTIFICATE OF CORRECTION

PATENT NO. : 5,331,964
DATED : July 26, 1994
INVENTOR(S) : Gregg E. Trahey, Paul D. Freiburger, Stephen W. Smith and Stewart S. Worrell It is certified that error appears in the above-indentified patent and that said Letters Patent is hereby corrected as shown below:

Before the Field of Invention please insert --This invention was made with Government support under Grant No. CA-43334 awarded by the National Institutes of Health. The Government has certain rights in the invention.--

Other Publications, Page 2, Column 1, please correct "L.M. Bohs, et al." to read --L.N. Bohs, et al.--.

Column 1, line 40, please correct "yon Ramm" to read --von Ramm--.

Column 9, line 13, please insert after (MC) -- 18 --.

Column 9, line 14, please delete "be".

Column 9, line 51, please correct "yon Ramm" to read --von Ramm--.

Signed and Sealed this

Twenty-second Day of November, 1994

Attest:

BRUCE LEHMAN

Attesting Officer    Commissioner of Patents and Trademarks